US012598580B2

(12) United States Patent
Balasubramanian et al.

(10) Patent No.: US 12,598,580 B2
(45) Date of Patent: Apr. 7, 2026

(54) MAP AWARE SAFETY SYSTEM

(71) Applicant: QUALCOMM Incorporated, San Diego, CA (US)

(72) Inventors: Anantharaman Balasubramanian, San Diego, CA (US); Gene Wesley Marsh, San Diego, CA (US); Dan Vassilovski, Del Mar, CA (US); Mayank Manocha, San Diego, CA (US); Arzu Karaer, San Diego, CA (US); Deviprasad Putchala, San Diego, CA (US); Mohit Narula, San Diego, CA (US); Richard Reid Hovey, Branchburg, NJ (US); Marc Adams, El Cajon, CA (US); Nam Soo Park, San Diego, CA (US); Chaitanya Mehta, Irvine, CA (US); Arthur Gubeskys, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 18/165,526

(22) Filed: Feb. 7, 2023

(65) Prior Publication Data

US 2024/0267881 A1 Aug. 8, 2024

(51) Int. Cl.
*H04W 64/00* (2009.01)
*G08B 21/02* (2006.01)
(52) U.S. Cl.
CPC .......... *H04W 64/006* (2013.01); *G08B 21/02* (2013.01)

(58) Field of Classification Search
CPC ............................. G08B 21/02; H04W 64/006
See application file for complete search history.

(56) References Cited

U.S. PATENT DOCUMENTS

| | | | |
|---|---|---|---|
| 11,725,955 B2 * | 8/2023 | Berman | G01C 21/3691 |
| | | | 701/423 |
| 2005/0253738 A1 * | 11/2005 | Kobayashi | G01C 21/26 |
| | | | 340/988 |
| 2010/0100324 A1 | 4/2010 | Caminiti et al. | |
| 2019/0367021 A1 | 12/2019 | Zhao et al. | |
| 2019/0367022 A1 | 12/2019 | Zhao et al. | |

(Continued)

FOREIGN PATENT DOCUMENTS

CA 3216842 A1 10/2022

OTHER PUBLICATIONS

International Search Report and Written Opinion—PCT/US2024/010719—ISA/EPO—May 17, 2024.

*Primary Examiner* — Dai Phuong
(74) *Attorney, Agent, or Firm* — Norton Rose Fulbright US LLP

(57) ABSTRACT

This disclosure provides systems, methods, and devices for wireless communication that support a sensing charging subscription. In a first aspect, a method of wireless communication includes receiving first location information associated with a first mobile entity. The method also includes transmitting an alert based on the first location information and path information configured to model multiple paths associated with an intersection region. The multiple paths include a first path that is curved. The path information defines multiple line segments to model the first path. Other aspects and features are also claimed and described.

27 Claims, 11 Drawing Sheets

(56) References Cited

U.S. PATENT DOCUMENTS

| 2020/0174481 | A1  |   6/2020 | Van Heukelom et al. |            |
|--------------|-----|----------|---------------------|------------|
| 2020/0286020 | A1* |   9/2020 | Kobayashi           | G06Q 50/40 |
| 2022/0314877 | A1* |  10/2022 | Yamoto              | G08G 1/162 |
| 2023/0236021 | A1* |   7/2023 | Ninomiya            | G01C 21/30 |
|              |     |          |                     | 701/446    |
| 2024/0369376 | A1* |  11/2024 | Zhang               | G01C 21/3822 |

* cited by examiner

600

| Segment # | Origin | Azimuth | Segment Length |
|-----------|--------|---------|----------------|
| Seg-21 | $X_{21} = (0,0)$ | $\alpha_{21}$ | $t_{21}$ |
| Seg-22 | $X_{22} = X_{21} + t_{21}\begin{bmatrix}\sin\alpha_{21}\\\cos\alpha_{21}\end{bmatrix}$ | $\alpha_{22}$ | $t_{22}$ |
| Seg-23 | $X_{23} = X_{22} + t_{22}\begin{bmatrix}\sin\alpha_{22}\\\cos\alpha_{22}\end{bmatrix}$ | $\alpha_{23}$ | $t_{23}$ |

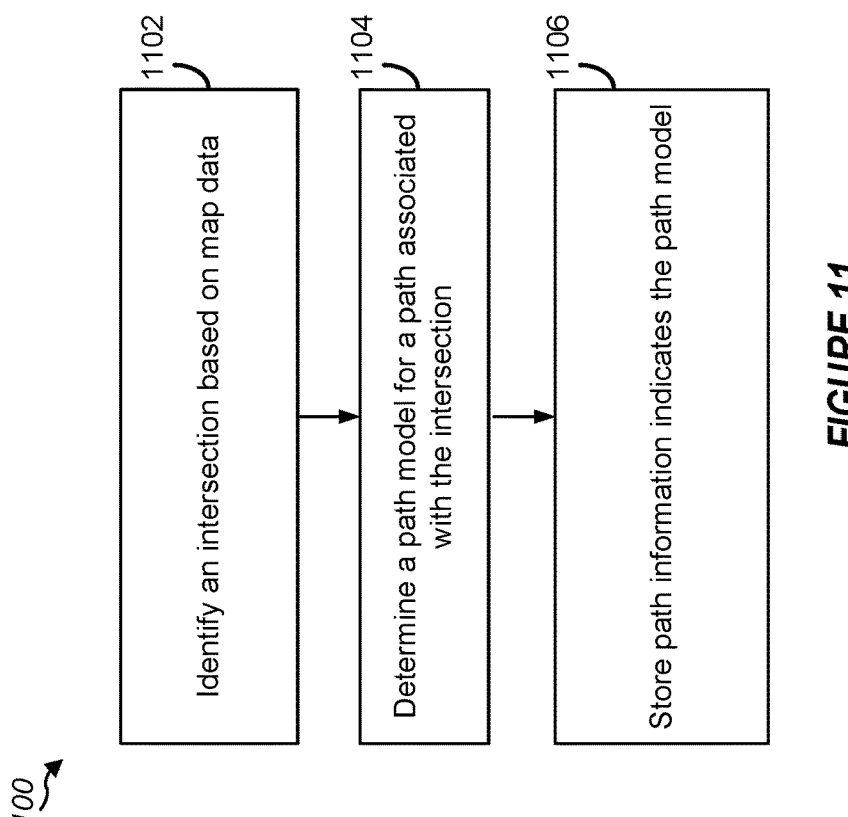

1100

1102 — Identify an intersection based on map data

1104 — Determine a path model for a path associated with the intersection

1106 — Store path information indicates the path model

1002 — Receive first location information associated with a first mobile entity

1004 — Transmit an alert based on the first location information and path information configured to model multiple paths associated with an intersection region, the multiple paths include a first path that is curved, and the path information defines multiple line segments to model the first path

FIGURE 10

MAP AWARE SAFETY SYSTEM

TECHNICAL FIELD

Aspects of the present disclosure relate generally to wireless communication systems, and more particularly, to a safety system, such as a safety system that utilizes map data. Some features may enable and provide improved entity tracking, improved and more relevant safety alerts, improved power efficiency, a reduction in intersection accidents, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Vehicle-to-everything (V2X) technology enables sharing of information from a vehicle to another device or entity that may affect the vehicle, and vice versa. V2X technology is associated with a vehicular communication system that can include one or more aspects or types of communication, such as vehicle-to-vehicle (V2V), vehicle-to-infrastructure (V2I), vehicle-to-network (V2N), vehicle-to-pedestrian (V2P), vehicle-to-device (V2D), and vehicle-to-grid (V2G), as illustrative, non-limiting examples. V2X technology can utilize cellular based communication or wireless local area network communication. In some implementations, messages and communication for the V2X technology are at an application and use an underlying radio as pipe (a communication path).

V2X-capable vehicles periodically broadcast their current status using application-layer messages such as the Basic Safety Message (BSM) or Cooperative Awareness Messages (CAM), nominally transmitted at a 100 milliseconds (ms) periodicity. These transmissions constitute the V2X basic safety capability, and at a minimum include vehicle identity, location, and motion state. In addition to basic safety, standards bodies, such as Society of Automotive Engineers (SAE), European Telecommunications Standards Institute (ETSI)-European Telecommunication Standard (ETS), and Chinese Standards Association, Society of Automotive Engineers of China (CSAE), are developing application-layer standards for advanced features including sensor-sharing (such as dissemination of detected vehicles or objects) and coordinated driving (such as sharing and negotiating intended maneuvers). In a V2P system, such messages may be detected may on or more UEs and used to alert a vulnerable road user (VRU), such as pedestrians, cyclists, and other micro-mobility user (e.g., scooter, Segway, etc.), to the presence of one or more vehicles. As compared to a roadway vehicle, such as a car, truck, or other vehicle that includes an alternator, a UE typically includes a storage device, such as a battery, which can be sensitive to power consumption. Frequent or continuous monitoring of V2X application-layer messages can present an unacceptable power drain (battery drain) for the UE.

Additionally, even with the implementation of such messages, a VRU may still be at risk of injury or a potential collision with a vehicle in certain circumstances, such as at an intersection, due to driver distraction or impairment, VRU distraction (e.g., the VRU at an intersection may be looking at a smart phone or watch/wearable while walking, jogging, or cycling), or a combination thereof.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a server. The method includes receiving first location information associated with a first mobile entity. The method further includes transmitting an alert based on the first location information and path information configured to model multiple paths associated with an intersection region. The multiple paths include a first path that is curved. The path information defines multiple line segments to model the first path.

In an additional aspect of the disclosure, an apparatus includes at least one processor and a memory coupled to the at least one processor. The at least one processor is configured to receive first location information associated with a first mobile entity. The at least one processor is further configured to transmit an alert based on the first location information and path information configured to model multiple paths associated with an intersection region. The multiple paths include a first path that is curved. The path information defines multiple line segments to model the first path.

In an additional aspect of the disclosure, an apparatus includes means for receiving first location information associated with a first mobile entity. The apparatus further includes means for transmitting an alert based on the first location information and path information configured to model multiple paths associated with an intersection region. The multiple paths include a first path that is curved. The path information defines multiple line segments to model the first path.

In an additional aspect of the disclosure, a non-transitory computer-readable medium stores instructions that, when executed by a processor, cause the processor to perform operations. The operations include receiving first location information associated with a first mobile entity. The operations further include transmitting an alert based on the first location information and path information configured to model multiple paths associated with an intersection region. The multiple paths include a first path that is curved. The path information defines multiple line segments to model the first path.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a table illustrating an example data structure of a path model that supports a safety system according to one or more aspects.

FIG. 9 is diagram of examples of timing diagrams of two entities that support a safety system according to one or more aspects.

FIG. 10 is a flow diagram illustrating an example process that supports a safety system according to one or more aspects.

FIG. 11 is a flow diagram illustrating an example process that supports a safety system according to one or more aspects.

Like reference numbers and designations in the various drawings indicate like elements.

DETAILED DESCRIPTION

Figure 1:
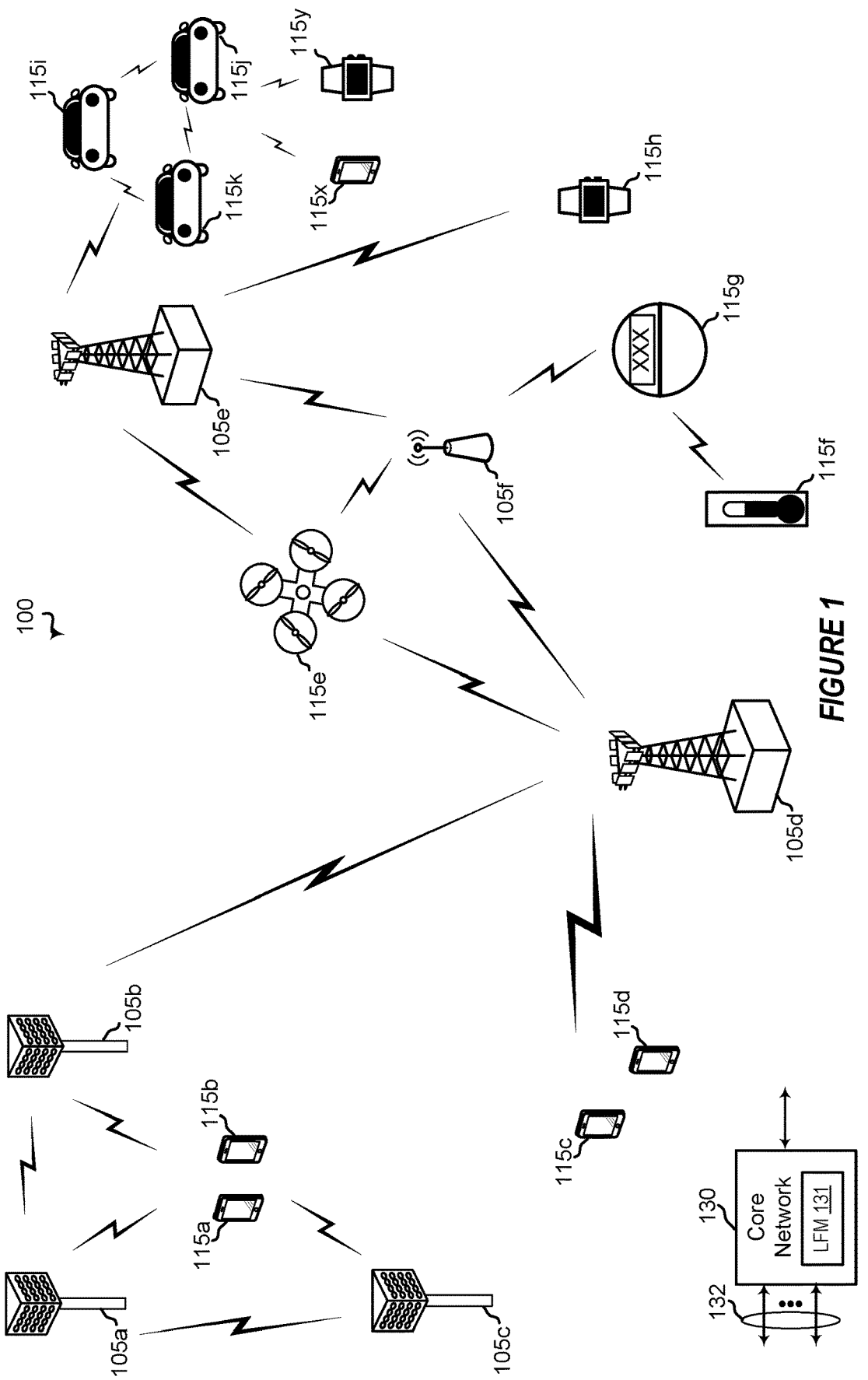
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a safety system. For example, the present disclosure describes server, such as a car-2-cloud server, that is configured to determine a collision potential between two entities, such as a user equipment (UE) and a vehicle, at an intersection. To enable the server to determine the collision potential, the server may store multiple path models associated with an intersection and that are configured to model a path of an entity toward the intersection. One or more of the path models may include a piecewise linearization of a corresponding path that leads toward or into the intersection. At least path one model may model a path that is curved. Each path model may define a set of line segments of the path model, and includes at least one line segment of the set of line segments of the path model that has an end point positioned in the intersection region. Additionally, or alternatively, each path model may include a data structure is stored in association with a map. For example, a data structure of a path model may be stored as metadata associated with the intersection region of the map. In some implementations, for a path model defining one or more line segments, the data structure may define or indicate, for each line segment of the set of line segments of the path model, the path model defines a segment identifier (ID) of the line segment, a first end point of the line segment, a second end point of the line segment, an azimuth of the line segment, a segment length of the line segment, or a combination thereof. In some implementations, the server may receive first location information of a first entity, select a first path model for the first entity, and use the first path model to estimate a first time period during which the first entity is predicted be in the intersection region. Additionally, the server may receive second location information of a second entity, select a second path model for the second entity, and use the second path model to estimate a second time period during which the second entity is predicted be in the intersection region. Based on the first time period and the second time period, the server may generate an alert based on a determination that that the first entity and the second entity are predicted to be in the intersection region at the same time.

Particular implementations of the subject matter described in this disclosure may be implemented to realize one or more of the following potential advantages or benefits. In some aspects, the present disclosure provides techniques for supporting a safety system. For example, the techniques described provide an alert message based on a possible collision at an intersection between two entities, when at least one of the entities is traveling along a curved path toward the intersection. By providing a piecewise linearization to model the curved path, a path model may be selected and used to effectively estimate travel of an entity toward the intersection, even when high measurement noise is present. The techniques further provide a data structure to define one or more path models such that the one or more path models may be stored in association with map data. For example, a data structure associated with an intersection included in the map data may be stored as metadata as part of the map data. Additionally, the techniques may provide improved entity tracking, improved and more relevant safety alerts, improved power efficiency, a reduction in intersection accidents, or a combination thereof.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~1 millisecond (ms)), and users with wide ranges of mobility or lack thereof, and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e. Additionally, V2V mesh network may include or correspond to a vehicle-to-everything (V2X) network between UEs 115i-115k and one or more other devices, such as UEs 115x, 115y.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example, the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
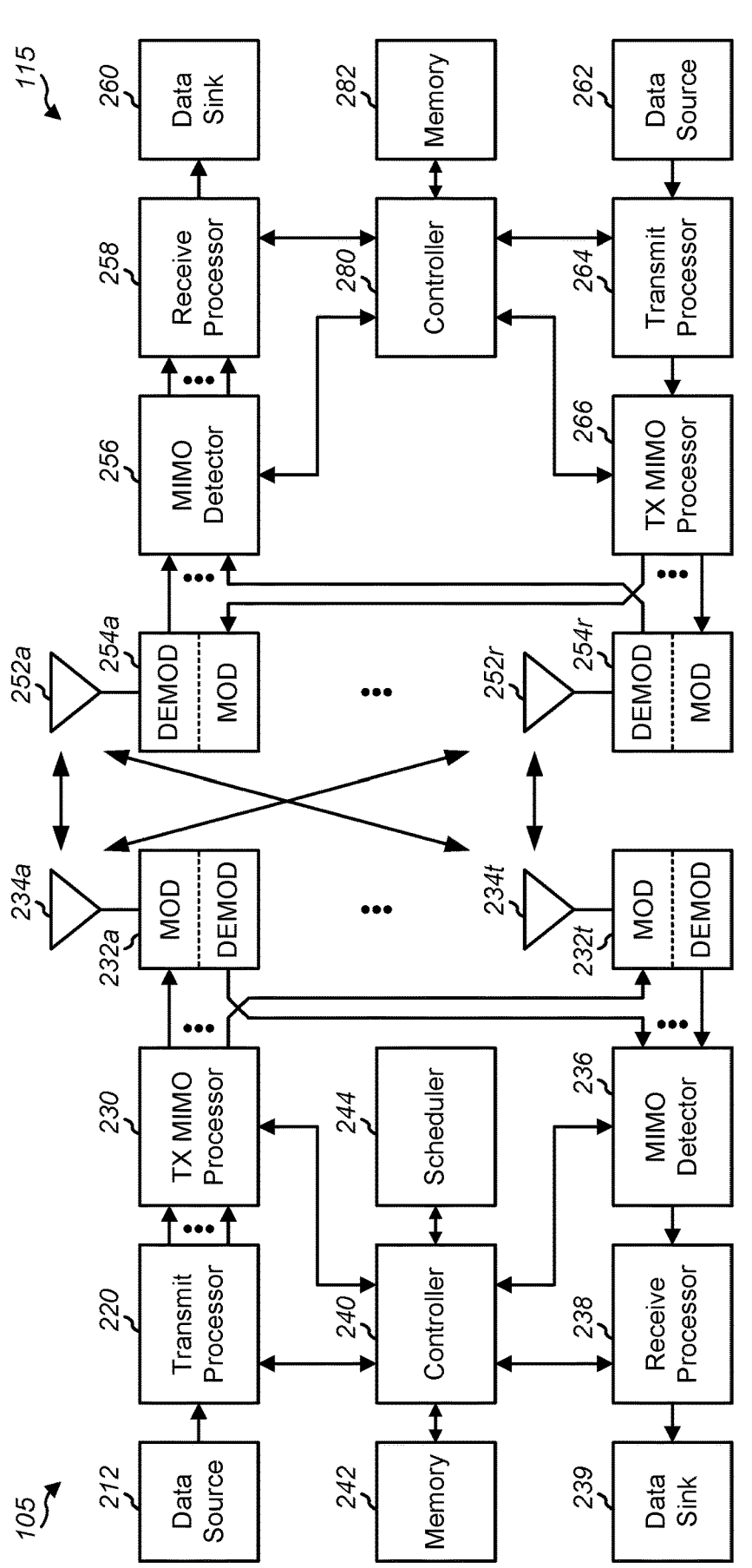
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in or described with reference to FIGS. 1-13, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
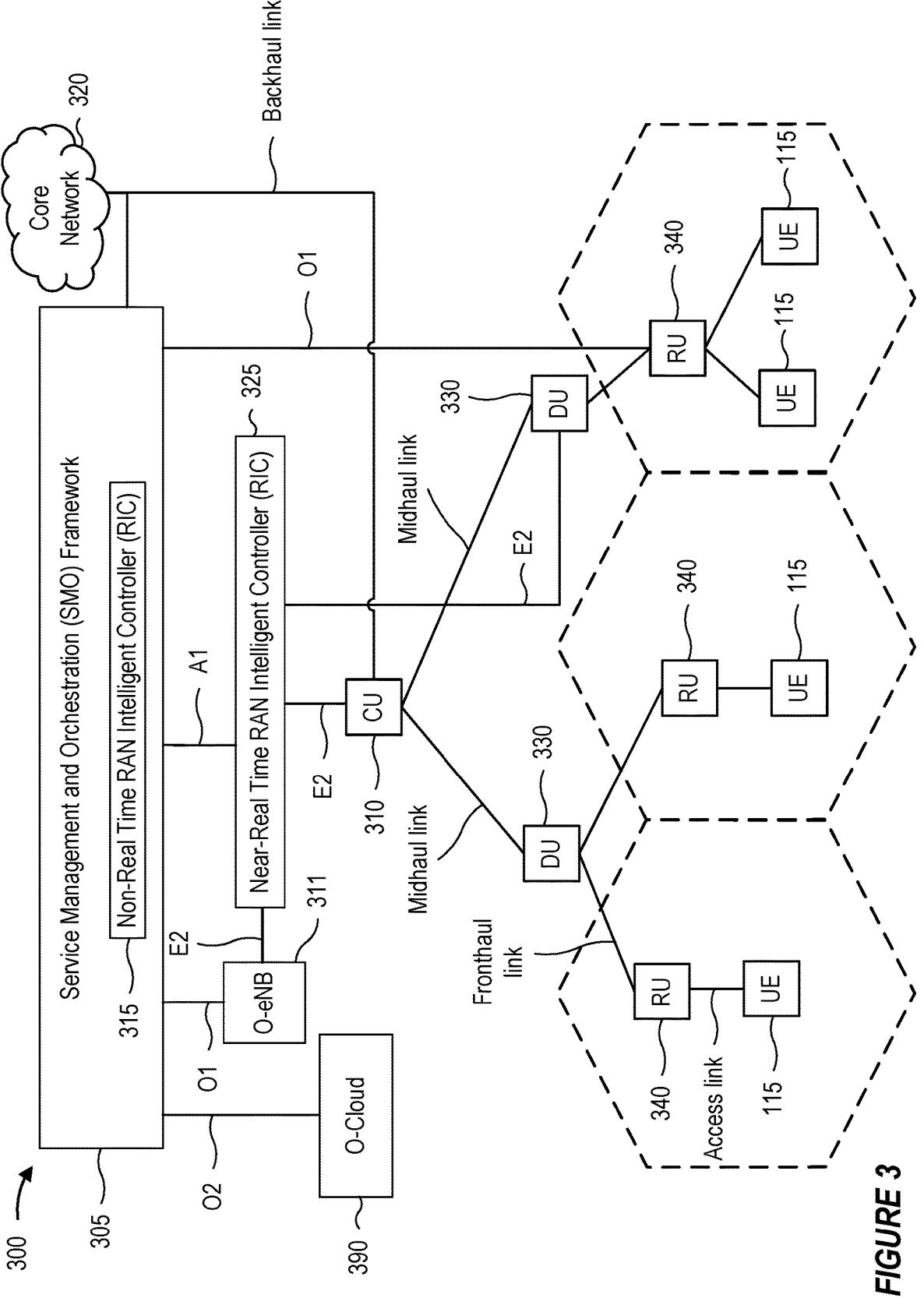
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node)

may include, be, or be included in (e.g., be a component of) a base station (e.g., any base station described herein), a transmission and reception point (TRP), a UE (e.g., any UE described herein), a network controller, an apparatus, a device, a computing system, an integrated access and back-hauling (IAB) node, a distributed unit (DU), a central unit (CU), a remote unit (RU), a core network, a LFM, a server, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
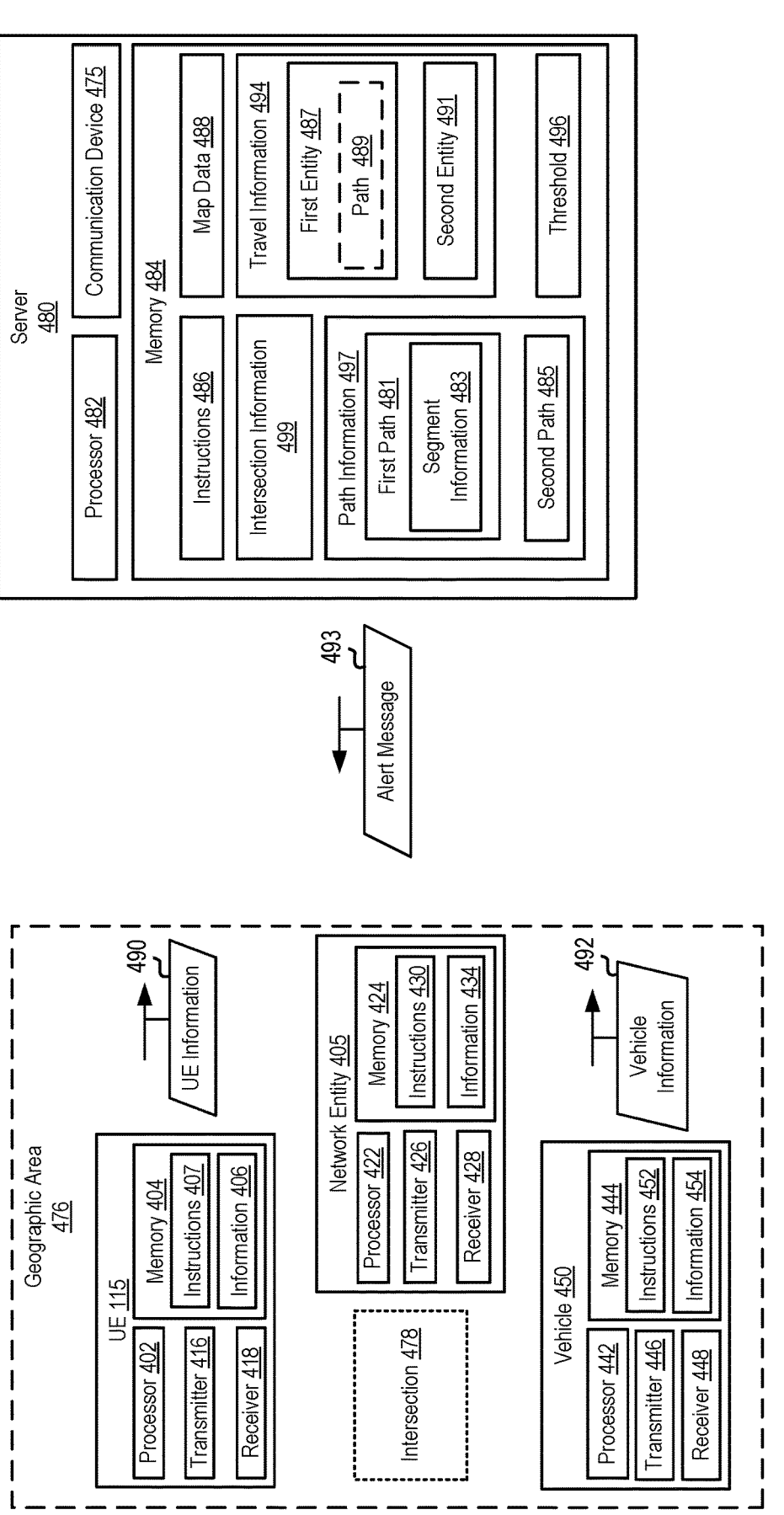
FIG. 4 is a block diagram illustrating an example wireless communication system that supports a safety system according to one or more aspects.

FIG. 4 is a block diagram of an example wireless communications system 400 that supports a safety system according to one or more aspects. In some examples, wireless communications system 400 may implement aspects of wireless network 100. Additionally, or alternatively, wireless communications system 400 may include or correspond to a vulnerable road user (VRU) alert system. Wireless communications system 400 includes UE 115, vehicle 450, a network entity 405, and a server 480. In some implementations, vehicle 450 may include or correspond to UEs 115*i*, 115*j*, 115*k* to FIG. 1. In some implementations, network entity 405 and server 480 may be individually or collectively referred to as a network, a network device, or a network system (e.g., a safety system). Although one UE 115, one vehicle 450, one network entity 405, and one server 480 are illustrated, in some other implementations, wireless communications system 400 may generally include multiple UEs 115, multiple vehicles 450, multiple network entities 405, multiple server 480, or a combination thereof.

In some implementations, wireless communication system 400 includes a V2X wireless communication system. V2X is a communication system in which information is passed between a vehicle and other entities within the wireless communication network that provides the V2X services. The V2X services may include services for Vehicle-to-Vehicle (V2V), Vehicle-to-Pedestrian (V2P), Vehicle-to-Infrastructure (V2I), and Vehicle-to-Network (V2N). One or more V2X standards aim to develop or support an Advanced Driver Assistance System (ADAS), which assist a driver with critical decisions, such as lane changes, speed changes, overtaking speeds, etc. Low latency communications may be used in V2X and, are therefore suitable for precise positioning. For example, positioning techniques, such as time of arrival (TOA), time difference of arrival (TDOA) or observed time difference of arrival (OT-DOA), or any other cellular positioning technique, may be enhanced using assistance from V2X.

In general, there may be at least two modes of operation for V2X services, as defined in Third Generation Partnership Project (3GPP) TS 23.285. One mode of operation uses direct wireless communications between V2X entities when the V2X entities are within range of each other. The other mode of operation uses network based wireless communication between entities. The two modes of operation may be combined or other modes of operation may be used if desired.

The wireless communication of a V2X wireless communication system may be over Proximity-based Services (ProSe) Direction Communication (PC5) reference point as defined in 3GPP TS 23.303, and may use wireless communications under Institute of Electrical and Electronics Engineers (IEEE) 1609, Wireless Access in Vehicular Environments (WAVE), Intelligent Transport Systems (ITS), and IEEE 802.11p, on the ITS band of 5.9 GHz, or other wireless connections directly between entities.

In some implementations, wireless communications system 400 is associated with a geographic area 476. Geographic area 476 may includes one or more roads that include at least one intersection 478. Intersection 478 may be any type of intersection, such as a "T" intersection, a "+" intersection, a "Y" intersection, a roundabout intersection, or other type of intersection. Additionally, the one or more roads may be associated with multiple paths that each lead toward or into intersection 478. For example, the one or more paths may be configured for vehicular traffic, pedestrian traffic, or a combination thereof. The one more roads or one or more paths may be linear, non-linear, curved, or a combination thereof. To illustrate, the one or more paths may be associated with a road, a car lane, a bus lane, a bike lane, a sidewalk, or a combination thereof, as illustrative, non-limiting examples.

In some implementations, UE 115, network entity 405, and vehicle 450 may be positioned within geographic area 476. Although each of UE 115, network entity 405, and vehicle 450 is described and shown as being positioned within geographic area 476, in other implementations, one or more of UE 115, network entity 405, or vehicle 450 may be positioned outside of geographic area 476. Additionally, or alternatively, UE 115 or vehicle 450 may be traveling towards or positioned within intersection 478. In some implementations, UE 115, vehicle 450, or both, are mobile devices. Network entity 405 may include a base station, such as base station 105, an access point, a roadside unit, another UE or vehicle, or part of a core network, such as core network 130. Network entity 405 may be stationary or mobile. Server 480 may include a server, base station 105, core network 130, or other device or system. For example, server 480 includes a car 2 cloud (C2C) server. In some implementations, server 480 is includes LMF 131.

In some implementations, UE 115, vehicle 450, or both, is configured to communicate with network entity 405 using a sidelink (SL) link/interface (e.g., using sidelink communication) or a Uu link/interface (e.g., using Uu communication). Server 480 may be in communication with (e.g., communicatively coupled to) UE, vehicle 450, or network entity 405 via a cellular network. Server 480 may be configured to be aware of a situational awareness (e.g., a position, a heading, a speed, etc.) of UE 115 or vehicle 450 based on information, such as a vehicle/VRU based on a basic safety message (BSM) message (for vehicle 450), a pedestrian safety message (PSM) message (for UE 115). Additionally, or alternatively, server 480 may be aware of the maps of or associated with geographic area 476, such as a map that indicates a nature of local intersections (e.g., 478), stop sign, traffic lights in geographic area, or other information, as illustrative, non-limiting examples.

UE 115 may include a device, such as a mobile device or a vehicle. In some implementations, UE 115 is a device that corresponds to a VRU. UE 115 may include a variety of components (such as structural, hardware components) used for carrying out one or more functions described herein. For example, these components may include one or more processors 402 (hereinafter referred to collectively as "processor 402"), and one or more memory devices 404 (hereinafter referred to collectively as "memory 404"). In some implementations, UE 115 may include an interface (e.g., a communication interface) that includes transmitter 416, receiver 418, or a combination thereof. Processor 402 may be configured to execute instructions 407 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 407 and information 406. Information 406 may include capability information, location information, travel information, or a combination thereof. Information 406 may include or indicate a location or position (e.g., latitude, longitude, elevation, etc.), position accuracy, a heading, a speed, a velocity, an altitude, a device state, a path history, a predicted path, a planned plan, an ID, a time, a steering wheel angle, acceleration, Yaw rate, brake system status, a device or vehicle size (e.g., a length, a width, a height, a weight, etc.), an event flag, or a combination thereof, as illustrative, non-limiting example.

UE 115 includes one or more transmitters 416 (hereinafter referred to collectively as "transmitter 416"), and one or more receivers 418 (hereinafter referred to collectively as "receiver 418"). Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105, network entity 405, vehicle 450, or another UE 115. In some implementations, transmitter 416 and receiver 418 may be integrated in one or more transceivers. Additionally, or alternatively, transmitter 416 or receiver 418 may include or correspond to one or more components of UE 115 described with reference to FIG. 2

In some implementations, UE 115 may include one or more antenna arrays. The one or more antenna arrays may be coupled to transmitter 416, receiver 418, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

Vehicle 450 may include a device, such as a mobile device or a vehicle. For example, vehicle 450 may include or correspond to UEs 115*i*, 115*j*, 115*k* to FIG. 1. Vehicle 450 may include a variety of components (such as structural, hardware components) used for carrying out one or more functions described herein. For example, these components may include one or more processors 442 (hereinafter referred to collectively as "processor 442"), and one or more memory devices 444 (hereinafter referred to collectively as "memory 444"). Processor 442 and memory 444 may include or correspond to processor 402 and memory 404 respectively. In some implementations, vehicle 450 may include an interface (e.g., a communication interface) that includes transmitter 446, receiver 448, or a combination thereof. Transmitter 446 and receiver 448 may include or correspond to transmitter 416 and receiver 418, respectively. Processor 442 may be configured to execute instructions 452 stored in memory 444 to perform the operations described herein. In some implementations, processor 442 includes or corresponds to one or more of receive processor 258, transmit processor 264, and controller 280, and memory 444 includes or corresponds to memory 282.

Memory 444 includes or is configured to store instructions 452 and information 454. Instructions 452 may include or correspond to instructions 407. Information 454 may include or correspond to information 406. Information 454 may include capability information, location information, travel information, or a combination thereof. Information 406 may include or indicate a location or position (e.g., latitude, longitude, elevation, etc.), position accuracy (e.g., a horizontal estimated position error (HEPE)), a heading, a speed, a velocity, an altitude, a device state, a path history, a predicted path, a planned plan, an ID, a time, a steering wheel angle, acceleration, Yaw rate, brake system status, a device or vehicle size (e.g., a length, a width, a height, a weight, etc.), an event flag, or a combination thereof, as illustrative, non-limiting example.

Vehicle 450 includes one or more transmitters 446 (hereinafter referred to collectively as "transmitter 446"), and one or more receivers 448 (hereinafter referred to collectively as "receiver 448"). Transmitter 446 is configured to transmit reference signals, control information and data to one or more other devices, and receiver 448 is configured to receive references signals, synchronization signals, control information and data from one or more other devices. For example, transmitter 446 may transmit signaling, control information and data to, and receiver 448 may receive signaling, control information and data from, base station 105, network entity 405, another vehicle 450, or UE 115. In some implementations, transmitter 446 and receiver 448 may be integrated in one or more transceivers. Additionally, or alternatively, transmitter 446 or receiver 448 may include or correspond to one or more components of UE 115 described with reference to FIG. 2

In some implementations, vehicle 450 may include one or more antenna arrays. The one or more antenna arrays may be coupled to transmitter 446, receiver 448, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of vehicle 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Vehicle 450 may include one or more components as described herein with reference to UE 115. In some implementations, vehicle 450 is a 5G-capable vehicle, a 6G-capable vehicle, or a combination thereof.

Network entity 405 may include a device, such as a base station, a roadside unit, a node, or another UE. Network entity 405 may be a mobile device or a stationary device. Network entity 405 may include a variety of components (such as structural, hardware components) used for carrying out one or more functions described herein. For example, these components may include one or more processors 422 (hereinafter referred to collectively as "processor 422"), and one or more memory devices 424 (hereinafter referred to collectively as "memory 424"). In some implementations, network entity 405 may include an interface (e.g., a communication interface) that includes transmitter 426, receiver 428, or a combination thereof. Processor 422 may be configured to execute instructions 430 stored in memory 424 to perform the operations described herein. In some implementations, processor 422 includes or corresponds to one or more of receive processor 238, transmit processor 220, and controller 240, and memory 424 includes or corresponds to memory 242.

Memory 424 includes or is configured to store instructions 430 and information 434. Information 434 may include or correspond to information 406 or 454. For example, network entity 405 may be configured to receive, from UE 115, UE information 490 that includes or indicates information 406. As another example, network entity 405 may be configured to receive, from vehicle 450, vehicle information 492 that includes or indicates information 454.

Network entity 405 includes one or more transmitters 426 (hereinafter referred to collectively as "transmitter 426"), and one or more receivers 428 (hereinafter referred to collectively as "receiver 428"). Transmitter 426 is configured to transmit reference signals, control information and data to one or more other devices, and receiver 428 is configured to receive references signals, synchronization signals, control information and data from one or more other devices. For example, transmitter 426 may transmit signaling, control information and data to, and receiver 428 may receive signaling, control information and data from, base station 105, UE 115, vehicle 450, another network entity 405, or server 480. In some implementations, transmitter 426 and receiver 428 may be integrated in one or more transceivers. Additionally, or alternatively, transmitter 426 or receiver 428 may include or correspond to one or more components of base station 105 described with reference to FIG. 2.

In some implementations, network entity 405 may include one or more antenna arrays. The one or more antenna arrays may be coupled to transmitter 426, receiver 428, or a communication interface. The antenna array may include multiple antenna elements configured to perform wireless communications with other devices, such as with UE 115 or base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of network entity 405. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Network entity 405 may include one or more components as described herein with reference to UE 115 or base station 105. In some implementations, network entity 405 is a 5G-capable network entity, a 6G-capable network entity, or a combination thereof.

Server 480 may include a variety of components (such as structural, hardware components) used for carrying out one or more functions described herein. For example, these components may include one or more processors 482 (hereinafter referred to collectively as "processor 482"), one or more memory devices 484 (hereinafter referred to collectively as "memory 484"), and one or more communication devices 475 (hereinafter referred to collectively as "communication device 475"). In some implementations, server 480 may include an interface (e.g., a communication interface) that includes communication device 475. Processor 482 may be configured to execute instructions 486 stored in memory 484 to perform the operations described herein. In some implementations, processor 482 includes or corresponds to one or more of receive processor 238, transmit processor 220, and controller 240, and memory 484 includes or corresponds to memory 242.

Memory 384 includes or is configured to store instructions 486, map data 488, intersection information 499, path information 497, travel information 494, and one or more thresholds 496 (hereinafter referred to collectively as "threshold 496").

Map data 488 may include or indicate aspects or features of geographic area 476. Map data 488 may include or indicate roads, intersections, traffic control devices, geographic features, hazards, or a combination thereof, as illustrative, non-limiting examples. In some implementation, map data 488 may include intersection information 499, path information 497, or a combination thereof. For example, map data 488 may include an intersection (e.g., 478) and may include meta data that is associate with the intersection. The metadata may include intersection information 499, path information 497, or a combination thereof.

Although described as being included in server 480, in other implementations, map data 48 may be stored in a database that remote or accessible to server 480.

Intersection information 499 may be associated with one or more intersections, such as intersection 478. For example, intersection information 499 may include or indicate information that defines or characterizes an intersection region associated with intersection 478. The intersection region may be defined to be the same or a different size or shape as intersection 478. In some implementations, intersection information 499 may indicate or define, for intersection 478, the intersection region associated with intersection 478, or a both, a size, a shape, an origin, a length, a road, a traffic control device, a geographic feature, a hazard, or a combination thereof, as illustrative, non-limiting examples.

Path information 497 includes or indicates one or more paths associated with the intersection region, such as the intersection region associated with intersection 478. In some implementations, at least one path of the one or more paths is a curved path, such as a non-linear path. Each path of the one or more paths may have an endpoint that is located or positioned within intersection 478 or the intersection region associated with intersection 478. Additionally, or alternatively, path information 497 may include one or more path models, where each path model of the one or more path models is configured to model a different path. For example, path information 497 may include or indicate a first path 481 (e.g., a first path model) and a second path 485 (e.g., a second path model). The first path model of first path 481 may define a first of line segments, such as multiple lines segments, to model first path 481, and a first line segment of the first set of line segments includes a first end point at a first location in intersection 478 or the intersection region associated with intersection 478. The second path model of second path 485 may define a second set of line segments to model second path 485, and a second line segment of the second set of line segments may include a second end point at a second location in intersection 478 or the intersection region associated with intersection 478. The first location and the second location are the same location or different locations. For example, the first location and the second location may both be the origin of intersection 478 or the intersection region associated with intersection 478.

Each path model of path information 497 may be configured to model a different path of the one or more paths. For example, each path model may include a data structure that defines a set of line segments, such as a set of one or more line segments, of the path model. To illustrate, first path 481 includes segment information 483 that indicates or defines the set of one or more line segments of first path 481. An example of a data structure of a path model is described further herein at least with reference to FIG. 6. Additionally, or alternatively, each path model may include at least one line segment of the set of line segments of the path model that has an end point positioned in intersection 478 or the intersection region of intersection 478. In some implementations, each path model defines, for each line segment of the set of line segments of the path model, a segment identifier (ID) of the line segment, a first end point of the line segment, a second end point of the line segment, an azimuth of the line segment, a segment length of the line segment, or a combination thereof.

Travel information 494 may includes or indicate travel or position information of UE 115, vehicle 450, or a combination thereof. For example, travel information 494 may include or indicate information 406, 434, or 454, UE information 490, or vehicle information 492. Additionally, or alternatively, travel information 494 may include or indicate a first entity 487, such as UE 115, and a second entity 491, such as vehicle 450. First entity 487 may include or indicate information 406 or UE information 490 associated with UE 115. Second entity 491 may include or indicate information 454 or vehicle information 492 associated with vehicle 450. In some implementations, travel information 494 may include or indicate a path, a path model, or a line segment that is associated with or assigned to an entity. For example, first entity 487 includes or indicates a path 489 that is assigned to first entity 487 (e.g., UE 115) to model a path of the first entity. To illustrate, path 489 may include or correspond to first path 481 (e.g., the first path model) or second path 485 (e.g., the second path model).

Threshold 496 may include or indicate one or more values, one or more ranges, or a combination thereof. Threshold 496 may be associated with a time, a duration, a heading, a distance, or a combination thereof.

In some implementations, wireless communications system 400 implements a 5G NR network. For example, wireless communications system 400 may include multiple 5G-capable UEs 115, multiple 5G-capable vehicles 450, multiple 5G capable network entities 405, or multiple 5G-capable base stations 105, such as UEs and base stations configured to operate in accordance with a 5G NR network protocol such as that defined by the 3GPP. In some other implementations, wireless communications system 400 implements a 6G network.

In some implementations, server 480 is configured to generate or use a piecewise linearization of a curved path or straight path leading into intersection 478. The piecewise linearization may include or correspond to a path model, such as first path 481 (e.g., the first path model). It is noted that the generate or use of the path model may be map aware, such that the path model is generated based on map data 488 or is associated with or included in map data 488. To generate the path model, server 480 may be configured to linearize the curved path into one or more smaller linear segments. To illustrate, server 480 may split the path into multiple segments is to approximate the expected heading of the entity to be constant within the segment. Server 480 may store the segment details of the path as a data structure that may be used to determine which path an entity (e.g., UE 115 or vehicle 450) is on. The data structure may include or indicate a relationship between the multiple segments, such that the multiple segments may model abrupt changes in heading from one segment to the next. The segment details may include or correspond to segment information 483.

Figure 5:
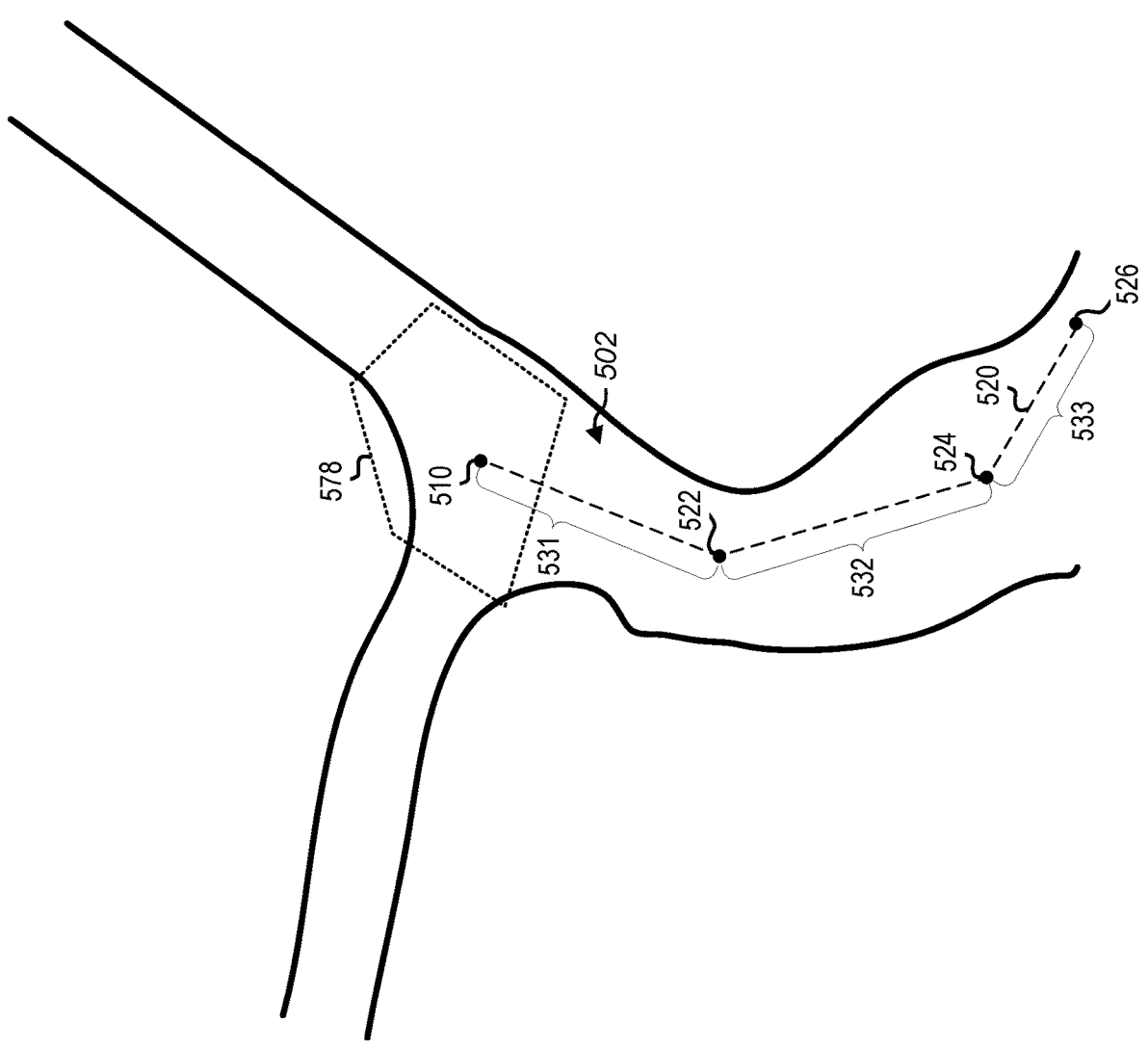
FIG. 5 is a diagram illustrating an example of a map that supports a safety system according to one or more aspects.

Referring to FIG. 5, FIG. 5 is a diagram illustrating an example of a map that supports a safety system according to one or more aspects. The map may include or correspond to map data 488.

The map includes one or more roads, such as roads 502. The map also indicates an intersection region 578, such as an intersection region that is associated with intersection 478. Intersection region 578 includes an origin at location 510.

The map also indicates a path model 520 (e.g., a first path model) of a curved path. Path model may include or correspond to first path 481. Path model 520 may model the curved path as three piece-wise linear segments, such as a first segment (seg-1) 531, a second segment (seg-2) 532, and a third segment (seg-3) 533. First segment (seg-1) 531, a second segment (seg-2) 532, and a third segment (seg-3) 533 may include or correspond to segment information 483. First segment (seg-1) 531 may extend between origin (at location 510) and location 522. Second segment (seg-2) 532 may extend between location 522 and location 524. Third segment (seg-3) 533 may extend between location 524 and location 526. It is noted that first segment (seg-1) 531, second segment (seg-2) 532, and third segment (seg-3) 533 approximates a travel path that may be taken by an entity traversing the curved path a location 526 to origin (at location 510).

Referring back to FIG. 4, server 480 may generate a data structure that includes or indicates path model, such as path model 520. For example, server 480 may perform map aware modeling of one or more segments of a path. In some implementations, server 480 may determine an endpoint (or origin) and a length for each segment of the path. To illustrate, let $t_{ij}$, $X_{ij}=(x_{ij}, y_{ij})$ be the length and the coordinates of segment-j of path-i respectively. The coordinates of first segment in the path is taken to be an origin (i.e., $X_{i1}=(0,0)\forall i$). In some implementations, the origin is a location included in the intersection region or a location identified as the origin of the intersection region. The coordinates of segment-j (j>1) of path-i may be represented as:

$$X_{ij} = X_{i,j-1} + t_{i,j-1}\begin{bmatrix} \sin \alpha_{i,j-1} \\ \cos \alpha_{i,j-1} \end{bmatrix},$$

where $\alpha_{ij}$ represents the azimuth (heading) of segment-j of path-i that is away from the origin. Once the length of each segment in the path is determined (or obtained from the map), the coordinates of the segments of path can be obtained based on the path model.

Referring to FIG. 6, FIG. 6 is a table illustrating an example data structure 600 of a path model that supports a safety system according to one or more aspects. Data structure 600 may include or correspond to path information 497, first path 481, segment information 483, or second path 485, or map data 488.

Data structure 600 includes multiple entries, where each entry corresponds to a segment. Each entry includes a segment number, an origin, an azimuth and a segment length. In is noted that data structure 600 includes a notion of segment-j of path-i used to represent a segment number as Seg-ij, an origin location as $X_{ij}$, an azimuth $\alpha_{ij}$, and a segment length $t_{ij}$.

Referring back to FIG. 4, intersection information 499, path information 497, or a combination thereof may be included in or stored as part of map data 488. In some such implementations, an origin of intersection 478 (or the intersection region) may be designated as origin O. For example, origin O may include or correspond to location 510. The origin of intersection 478 may be a geometric center, or another point, of intersection 478 or the intersection region. In some implementations, multiple paths may meet or intersect at origin O. For example, all paths associated with intersection 478 or intersection region may meet at origin O. In other implementations, one path or no paths meet or are located at origin O. In some such implementations, each path model may include or indicate a corresponding location that is included in or intersects intersection 478 or the intersection region.

In some implementations, intersection information 499, path information 497, or a combination thereof may be included in or stored as part of map data 488 as meta data associated with intersection 478. In some implementations, the metadata may include or indicate a data structure, such as data structure 600, for each path that intersects with intersection 478 or the intersection region. Additionally, or alternatively, the metadata may include or indicate origin O of intersection 478, one or more traffic control devices (e.g., a stop sign, a speed breaker/bump present at each path-i near to the origin of intersection 478, etc.), or a combination thereof.

Figure 7:
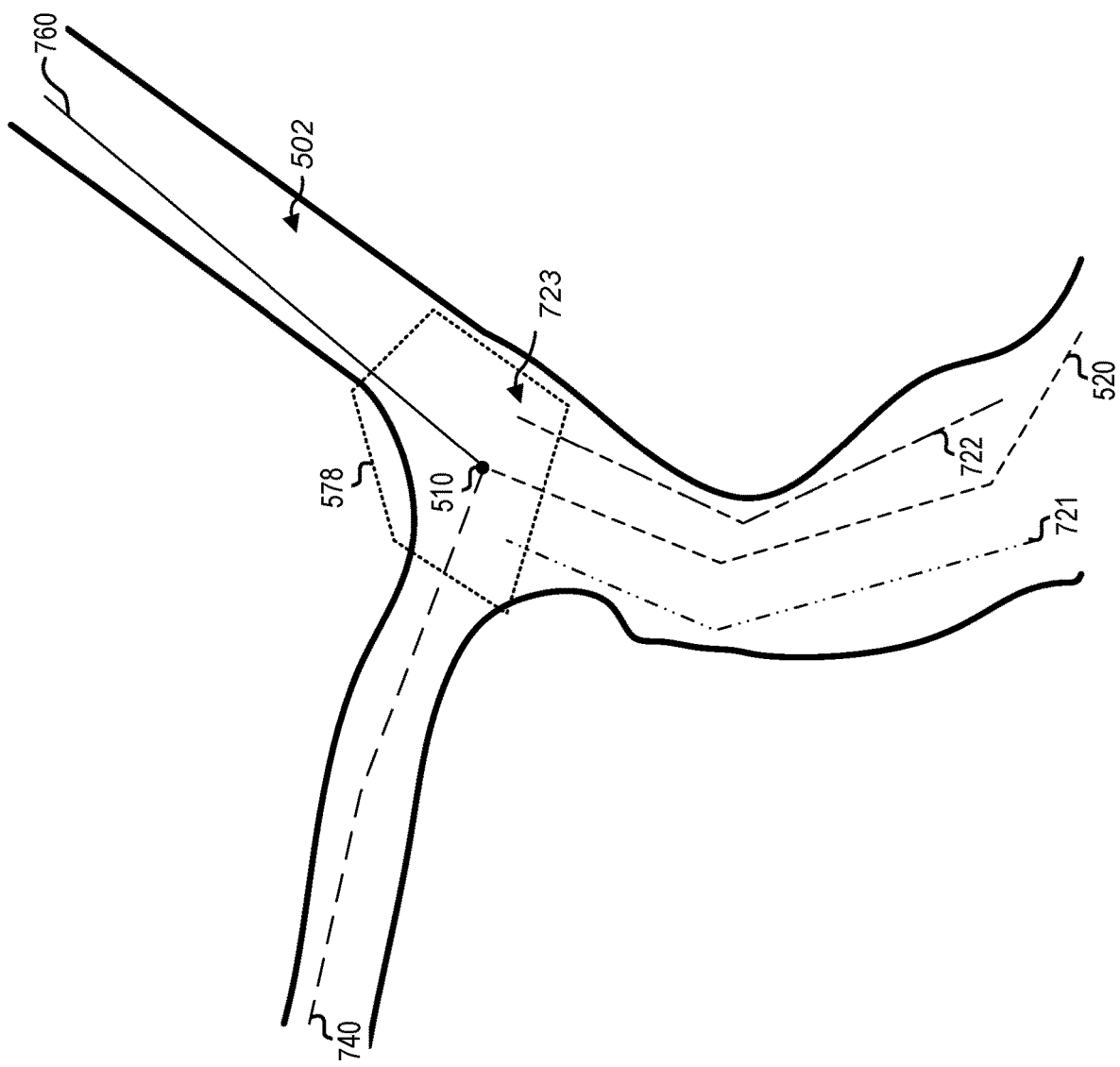
FIG. 7 is a diagram illustrating another example of a map that supports a safety system according to one or more aspects.

Referring to FIG. 7, FIG. 7 is a diagram illustrating another example of a map that supports a safety system according to one or more aspects. The map of FIG. 7 may include or correspond to map data 488. Additionally, or alternatively, the map of FIG. 7 may include or correspond to the map of FIG. 5.

As compared to the map of FIG. 5, the map of FIG. 7 shows additional modeled paths—e.g., additional path models other than first path model 520. For example, the map of FIG. 7 includes a second path model 721, a third path model 722, a fourth path model 740, and a fifth path model 760. Each of second path model 721 and third path model 722 include two segments. It is noted that an origin of each of second path model 721 and third path model 722 is different from location 510, such as an origin of intersection region 578. To illustrate, third path model 722 includes an endpoint at location 723. Fourth path model 740 includes two segments and has an endpoint at location 510. Fifth path model 760 includes a single segment that has an endpoint at location 510. Each of first path model 520, second path model 721, third path model 722, fourth path model 740, and fifth path model 760 may be represented or defined based on a data structure, such as data structure 600.

Referring again to FIG. 4, server 480 may be configured to, for an entity such as UE 115 or vehicle 450, identify intersection 478 or the intersection region based on the intersection. For example, in some implementations, server 480 may identify a closest intersection to the entity. To illustrate, intersection 478 or intersection information 499 may include or indicate an origin associated with intersection 478. If $O(I_j)$ denotes the origin of intersection $I_j$ (e.g., 478), and a location of the entity (e.g., 115 or 450) is denoted as V, server 480 may determine an intersection k that has the least distance from V to $O(I_j)$. That is, $k=\text{argmin}_j d(V, O(I_j))$, where d( ) is an appropriate distance measure. In some implementations, the closest intersection may be a closest intersection in a direction of travel of the entity or within a threshold range of a direction of travel of the entity. In some other implementations, server 480 may determine the intersection k using situational awareness information that is obtained from the entity, such as a camera, a radar, or other device of the entity. To illustrate, the entity may be closest to or at a first intersection and the situational awareness information may indicate that no other entity is present or proximate to the first intersection. In some such situations, server 480 may identify a second intersection, such as a next intersection in a direction of travel of the entity. Server 480 may determine a path associated with the entity based on the second intersection.

In some implementations, server 480 is configured to identify a path that is associated with an entity (e.g., UE 115 or vehicle 450). To illustrate, server 480 may assign the entity to a path model based on location or travel information associated with the entity, and use the assigned path model to estimate or predict one or more locations of the entity. For example, based on a location (e.g., a noisy location) of an entity E, the path and segment to which the entity E belongs (or is assigned) may be obtained by minimizing a perpendicular distance between the entity E and all modeled paths associated with an intersection k. In some implementations, the perpendicular distance may be a distance in a direction that is perpendicular to a heading of the entity E. Server 480 may select the path model to assign to the entity E as the one that has the least perpendicular distance from the entity E. For example, referring to FIG. 8, FIG. 8 is a diagram illustrating another example of a map that supports a safety system according to one or more aspects.

Figure 8:
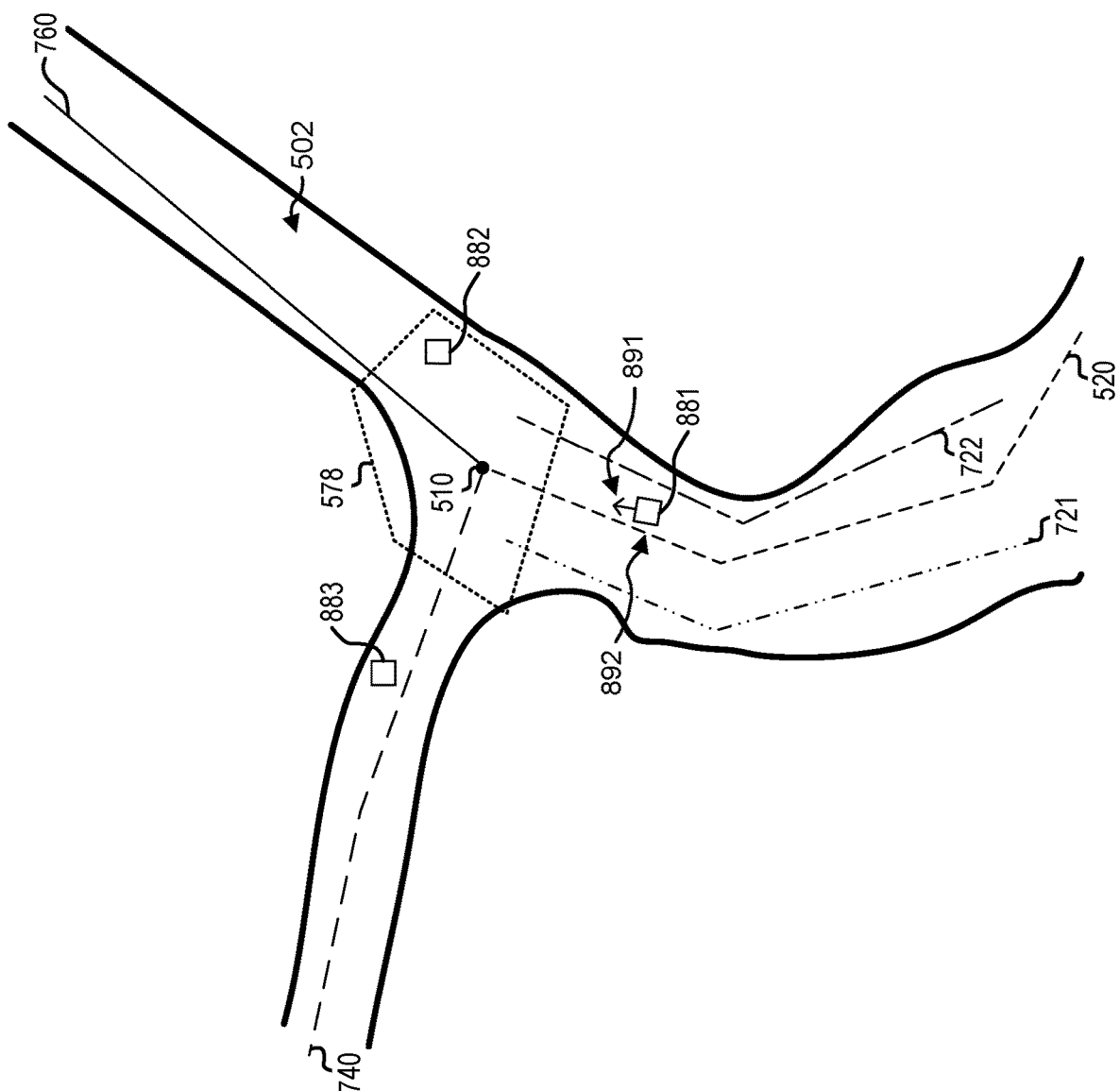
FIG. 8 is a diagram illustrating another example of a map that supports a safety system according to one or more aspects.

The map of FIG. 8 may include or correspond to map data 488. Additionally, or alternatively, the map of FIG. 8 may include or correspond to the map of FIG. 5 or the map of FIG. 7. As compared to the map of FIG. 7, the map of FIG. 8 includes entities, such as a first entity 881, a second entity 882, and a third entity 883.

First entity 881 is assigned to first path model 520. To illustrate, server 480 may determine a direction of travel or a heading (indicated by arrow 891) of first entity 881. Server 480 may determine a distance (in a direction perpendicular to a heading indicated by arrow 891) from first entity to each path modeled by a path model that is associated with intersection region 578. Based on the perpendicular distances, server 480 may determine a path, a segment, or both, of first path model 520 is the closest to first entity 881 and may assign first path model 520 to first entity 881. Additionally, server 480 may determine that second entity 882 is included in intersection region 578 and may abstain or refrain from identifying a path model to assign to second entity 882. Server 480 may determine that third entity 883 is closest to fourth path model 740.

Based on server 480 assigning first entity 881 to first path model, server 480 may estimate a distance from first entity 881 to intersection region 578 or an amount of time for first entity 881 to arrive at intersection region 578. For example, server 480 may use a shortest distance (directly or perpendicular to the direction of travel of first entity) to determine a location on a segment of first path model 520. Server 480 may use the determined location on the segment of first path model 520 to estimate the distance from first entity 881 to intersection region 578 or the amount of time for first entity 881 to arrive at intersection region 578.

In some implementations, server 480 may compare a heading an entity, such as first entity 881, to confirm the identified path mode. To illustrate, $\beta$ is the heading of first entity 881, and $\alpha_{ij}$ is the azimuth (or is the azimuth plus 180 degrees) of segment-j of path-i traversing into intersection region 578, where $\beta$, $\alpha_{ij}$ are each positive angles. Based on the above, if $|\alpha_{ij}-\beta| \le \text{THR1}$, where is a threshold (e.g., 496), sever 480 may determine that first entity 488 is in segment-j of path-i (of first path model 520). However, if $|\alpha_{ij}-\beta| > \text{THR2}$, server 480 may determine that first entity 480 is not heading towards intersection region 578.

In some implementation, if an entity is within intersection 478 or intersection region 578, server 480 may not consider a heading of the entity, such as second entity 882. While the entity is positioned within intersection 478 or intersection region 578, the entity is vulnerable to a collision with another entity that may enter or is present in intersection 478 or intersection region 578. In some such situations, server 480 may estimate an amount of time that the entity will remain in intersection 478 or intersection region 578. For example, server 480 may estimate the amount of time as an amount of time for the entity to exit a farthest point (of intersection 478 or intersection region 578) from the entity. As another example, server 480 may estimate the amount of time as an amount of time for the entity to traverse a longest linear distance across intersection 478 or intersection region 578.

Referring back to FIG. 4, in some implementations, server 480 may not assign an entity to a path model or a segment of a path model if an HEPE associated with the entity is greater than or equal to a threshold. The HEPE of an entity may include or correspond to information 406, 434, or 454, UE information 490, or vehicle information 492. The threshold may include or correspond to threshold 496.

In some implementations, server 480 is configured to determine or calculate a collision potential associate with or between two entities. For example, server 480 may determine a collision potential associated of a collision within intersection 478 or the intersection region (e.g., 578) of intersection 478. To illustrate, server 480 may estimate or predict a time period (e.g., a duration) that a first entity (e.g., UE 115) is predicted to be in the intersection region, an entry time that the first entity enters the intersection region, an exit time that the first entity exits the intersection region, or a combination thereof. Additionally, or alternatively, server 480 may estimate or predict a time period (e.g., a duration) that a second entity (e.g., vehicle 450) is predicted to be in the intersection region, an entry time that the second entity enters the intersection region, an exit time that the second entity exits the intersection region, or a combination thereof. Based on a duration that the first entity and the second entity are predicted to be in the intersection region at the same time, server 480 may generate or transmit an alert message, such as alert message 493. In some implementations, server 480 may determine an overlap time, such as a predicted amount of time that the two entities are estimated to be in the intersection region at the same time. Server 480 may generate or transmit alert message 493 based on a determination that the overlap time is greater than or equal to a threshold (e.g., 496).

Figure 9:
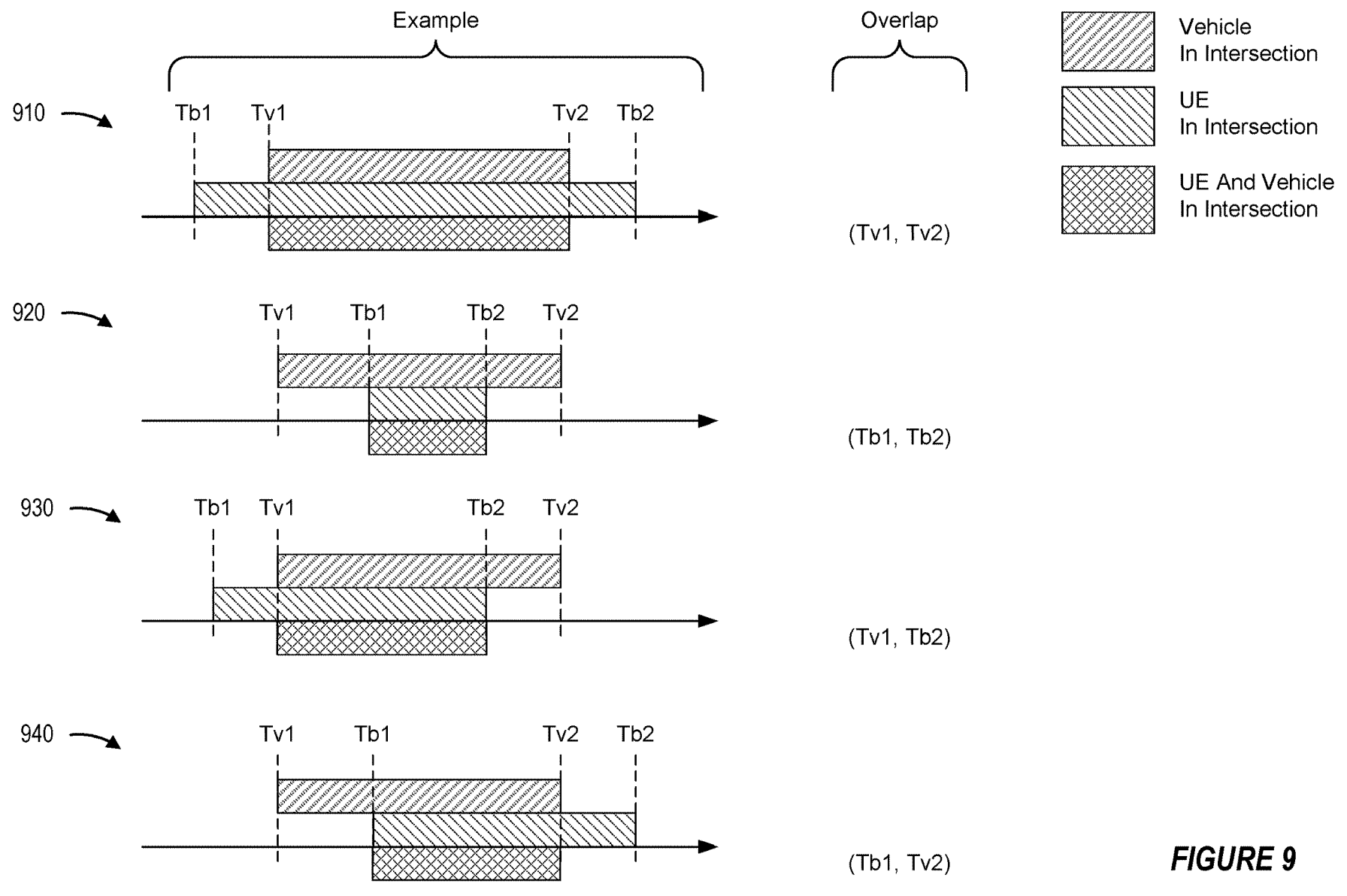

Referring to FIG. 9, FIG. 9 is diagram of examples of timing diagrams of two entities that support a safety system according to one or more aspects. For example, the two entities may include UE 115 and vehicle 450. FIG. 9 includes four examples, such as a first example, 910, a second example 920, a third example 930, and a fourth example 940. Each of the examples 910-940 is associated with a predicted collision potential.

For example, server 480 is configured to calculate or predict, for vehicle 450, $[T_1, T_2]$, where $T_{v1}$ is a predicted entry of vehicle 450 at the intersection region (e.g., 578) and $T_{12}$ is a predicted exit time of vehicle 450 at the intersection region. As another example, server 480 is configured to calculate or predict, for UE 115, $[T_{b1}, T_{b2}]$, where $T_{b1}$ is a predicted entry of UE 115 at the intersection region (e.g., 578) and $T_{b2}$ is a predicted exit time of UE 115 at the intersection region. Server 480 may determine a predicted time overlap $T_o$ between vehicle 450 and UE 115. Server 480 may generate or transmit alert message 493 based on the predicted time overlap $T_o$ being greater than or equal to a threshold (e.g., 496).

Referring to FIG. 4, an example of operation of wireless communications system 400 includes UE 115 and vehicle 450 in geographic area 476. UE 115 transmits UE information 490. UE information 490 may be receive by network entity 405 or server 440. In some implementations, network entity 405 receives UE information 490 and transmits UE information 490 to server 480.

Server 480 receives UE information 490 and stores UE information 490 at travel information 494. For example, server 480 may store UE information 490 at first entity 487. Server 480 may access map data 488 and identify, using map data 488 and based on UE information 490, intersection information 499. For example, server 480 may identify an intersection region associated with intersection 478 that server 480 determines UE 115 is traveling towards. Based on intersection information and UE information 490, server 480 may identify a path model to be assigned to UE 115. For example, server 480 may identify first path 481 (e.g., a first path model) that is assigned to UE 115 and indicated by path 489. Using the first path model, server 480 may estimate or predict a first time period (e.g., a duration) that UE 115 is predicted to be in the intersection region, a first entry time that UE 115 enters the intersection region, a first exit time that UE 115 exits the intersection region, or a combination thereof.

Vehicle 450 transmits vehicle information 492. Vehicle information 492 may be receive by network entity 405 or server 440. In some implementations, network entity 405 receives vehicle information 492 and transmits vehicle information 492 to server 480.

Server 480 receives vehicle information 492 and stores vehicle information 492 at travel information 494. For example, server 480 may store vehicle information 492 at second entity 491. Server 480 may access map data 488 and identify, using map data 488 and based on vehicle information 492, intersection information 499. For example, server 480 may identify an intersection region associated with intersection 478 that server 480 determines vehicle 450 is traveling towards. Based on intersection information and vehicle information 492, server 480 may identify a path model to be assigned to vehicle 450. For example, server 480 may identify second path 485 (e.g., a second path model) that is assigned to vehicle 450. Using the second path model, server 480 may estimate or predict a second time period (e.g., a duration) that vehicle information 492 is predicted to be in the intersection region, a second entry time that vehicle information 492 enters the intersection region, a second exit time that vehicle information 492 exits the intersection region, or a combination thereof.

Server 480 may determine or calculate a collision potential associate with or between UE 115 and vehicle 450. For example, server 480 may estimate or predict a collision potential time period (e.g., a duration) that UE 115 and vehicle 450 are both predicted to be in the intersection region. Based on the collision potential time period (e.g., a duration of the collision potential time period), server 480 may generate or transmit an alert message, such as alert message 493. In some implementations, server 480 may generate or transmit alert message 493 based on a determination that the overlap time is greater than or equal to a threshold (e.g., 496), based on an alter characteristic received from UE 115 or vehicle 450, or a combination thereof.

As described with reference to FIGS. 4, the present disclosure provides techniques for supporting a sensing charging subscription. The techniques described provide processes, information, and signaling for generation of alert message 493 based on a possible collision at an intersection between two entities (e.g., UE 115 and vehicle 450), when at least one of the entities is traveling along a curved path toward intersection 478. By providing a piecewise linearization to model the curved path, a path model (e.g., path information 497 or first path 481) may be selected and used to effectively estimate travel of an entity toward intersection 478, even when high measurement noise is present. The techniques further provide a data structure (e.g., 600) to define one or more path models such that the one or more path models may be stored in association with map data 488. For example, a data structure associated with intersection 478 included or identified in map data 488 may be stored as metadata as part of map data 488. Additionally, the techniques may provide improved entity tracking, improved and more relevant safety alerts, improved power efficiency, a reduction in intersection accidents, or a combination thereof.

FIG. 10 is a flow diagram illustrating an example process 1000 that supports a safety system according to one or more aspects. Operations of process 1000 may be performed by a server, such as core network 130, server 480, base station 105, or network entity 405, or a server as described above with reference to FIG. 12. For example, example operations of process 1000 may enable the server to support a safety system.

At block 1002, the server receives first location information associated with a first mobile entity. For example, the first mobile entity may include or correspond to UE 115 or vehicle 450. The first location information may include or correspond to information 406, 434, or 454, travel information 494, UE information 490, or vehicle information 492.

At block 1004, the server transmits an alert based on the first location information and path information configured to model multiple paths associated with an intersection region. The alert may include or correspond to alert message 493. The intersection may include or correspond to intersection 478, map data 488, or intersection information 499. The path information may include or correspond to path information 497, first path 481, second path 485, path model 520, 721, 722, or 740. The multiple paths may include a first path that is curved (e.g., non-linear). For example, the first path may include or correspond to path model 520, 721, 722, or 740. The path information defines multiple line segments to model the first path. For example, the line segments may include or correspond to segment information 483 or segment 531-533.

In some implementations, the server estimates, based on the first location information and the path information, a first time period during which the first mobile entity is predicted be in the intersection region. Additionally, or alternatively, the server may receive receiving second location information associated with a second mobile entity. For example, the first mobile entity including one of a vehicle and a UE associated with a pedestrian, and the second mobile entity include the other of the vehicle and the UE. The server may estimate, based on the second location information and the path information, a second time period during which the second mobile entity will be in the intersection region. The sever may be configured to generate the alert based on an overlap of the first time period and the second time period. Examples to illustrate the overlap are described further herein, at least with reference to FIG. 9. In some implementations, the server receives, from the first mobile entity, an indicator of an alert characteristic. For example, the indicator may be included in UE information 490 or vehicle information. The alert characteristic may indicate an amount of time to send the alert prior to a predicted time at which the first mobile entity is predicted to enter the intersection region. The alert (e.g., alert message 493) may be transmitted to the first mobile entity based on the indicator.

In some implementations, the path information includes multiple path models. For example, the multiple path models may include or correspond to first path 481 (e.g., a first path model) and second path 485 (e.g., a second path model). An illustrative example of data structure of a path mode is described herein at least with reference to FIG. 6. Each path model of the multiple path models may be configured to model a different path of the multiple paths. In some implementations, each path model of the multiple path models defines a set of line segments of the path model, and includes at least one line segment of the set of line segments of the path model that has an end point positioned in the intersection region.

In some implementations, the multiple path models include a first path model of the first path, and a second path model of a second path of the multiple paths. For example, the first path model may include or correspond to first path 481, and the second path model may include or correspond to second path 485. The first path model may define the multiple lines segments. Additionally, or alternatively, a first line segment of the multiple line segments, or associated with the first path, may include a first end point at a first location in the intersection region. The second path model may include one or more line segments to model the second path. The second line segment of the one or more line segments may include a second end point at a second location in the intersection region. In some implementations, the first location and the second location are the same location.

In some implementations, for each path model of the multiple path models and for each line segment of the set of line segments of the path model, the path model defines a segment ID of the line segment, a first end point of the line segment, a second end point of the line segment, an azimuth of the line segment, a segment length of the line segment, or a combination thereof. For example, at least one path model of the multiple path mode may have a data structure as described herein at least with reference to FIG. 6.

In some implementations, the server determines, based on the first location information, a direction of travel of the first mobile entity and a location of the first mobile entity. For example, the direction of travel may include or correspond to representative arrow 891. Additionally, or alternatively, the server may determine distances from the first mobile entity to modeled paths of the multiple path models. To determine the distances, the server may, for each path model of the multiple path models, determine a distance (in a direction that is perpendicular to the direction of travel) from the location of the first mobile entity to a modeled path of the path model. The server may select a first path model of the multiple path models having a shortest distance of the determined distances. In some implementations, the server may assign the first path model to the first mobile entity—e.g., based on the first path having the shortest distance. Additionally, or alternatively, the sever may determine a line segment (associated with the shortest distance) of the selected first path model. In some implementations, the server may determine a difference based on an azimuth of the line segment and a heading of the first mobile entity. The server may perform a comparison based on the difference and a first threshold. The first threshold may include or correspond to threshold 496. In some implementations, the assigned first path model may include or correspond to path 489 (e.g., a path ID of a first path model). For example, the server may assign the first path model to the first mobile entity based on a result of the comparison.

In some implementations, the server may estimate, based on the first path model assigned to the first mobile entity, a time period that the first mobile entity is predicted to be in the intersection region. For example, the server may determine the time period as described herein a least with reference to FIG. 3. The time period may include or indicate an entry time that the first mobile entity is predicted to enter the intersection region, an exit time that the first mobile entity is predicted to leave the intersection region, a duration between the entry and the exit, or a combination thereof. The server may generate the alert based on a determination that the first entity is predicted to be in the intersection region at the same time a second mobile entity. In some implementations, the server receives additional location information associated with the first mobile entity. For example, the additional location information may be received after the first location information. The server may determine, based on the additional location information, that the first mobile entity is within the intersection region. The server may estimate, based on a dimension of the intersection region, a time that the first mobile entity is predicted to leave the intersection region.

In some implementations, the server determines a horizontal estimated position error associated with the first mobile entity. The horizontal estimated position error may include or correspond to information 406, 434, or 545, UE information 490, vehicle information 492, or travel information 494. The server may perform a comparison based on the horizontal estimated position error and a second threshold. The second threshold may include or correspond to threshold 496. The first path model may be assigned to the first mobile entity based on the horizontal estimated position error being less than or equal to the second threshold.

In some implementations, the server identifies, based on map data, intersection region information associated with the intersection region. For example, the intersection region information may include or correspond to intersection information 499. In some implementations, the server is configured to select the intersection region (or the intersection region information) based on the first location information. For example, the intersection region may be selected based on a distance between a first location associated with the first mobile entity and a second location associated with the intersection region, a direction of travel of the first mobile entity, situational awareness information included in the first location information, or a combination thereof. The map data may include or correspond to map data 488. In some such implementations, the server may access the map data. The intersection region information may be stored as metadata of the map data. Additionally, or alternatively, the intersection region information may indicate an origin location associated with the intersection region, indicates one or more paths associated with the intersection region, one or more traffic control devices associated with the intersection region, the path information, or a combination thereof.

FIG. 11 is a flow diagram illustrating an example process 1100 that supports a safety system according to one or more aspects. Operations of process 1100 may be performed by a server, such as core network 130 or server 480, base station 105, or network entity 405, or a server as described above with reference to FIG. 12. For example, example operations of process 1100 may enable the server to support a safety system.

At block 1102, the server identifies an intersection based on map data. The map data may include or correspond to map data 488. In some implementations, the server receives and stores the map data. The intersection may include or correspond to intersection 478.

At block 1104, the server determines a path model for a path associated with the intersection. In some implementations, to determine a path model, the server identifies a path based on the map data, such as a path that leads toward or into intersection 478. For example, the server may use image or object recognition to identify or generate the path based on the map data. In some implementations, the server may identify or generate the path based on a road, a traffic maker (e.g., a lane marker, a crosswalk, a bike lane marker, a bus lane marker, etc.), a sidewalk, a curb, or other feature, as illustrative non, limiting examples. Additionally, or alternatively, the server may identify multiple paths.

Based on the identified path, the server may generate a path model of the path. The path model may include a data structure, such as the data structure described herein at least with reference to FIG. 6. In some implementations, to generate the path model, the server determines whether a change in heading of the path (e.g., of an object traveling along the path) from endpoint to endpoint is greater than or equal to a threshold. If the change in heading is greater than or equal to the threshold, the server performs a piece wise linearization of the path to generate multiple segments to model the path.

At block 1106, the server stores path information that indicates the path model. For example, the server may store path information 497 that includes or indicates first path 481 (e.g., a first path model). In some implementations, the path model or the path information may be stored as metadata of the map data.

Figure 12:
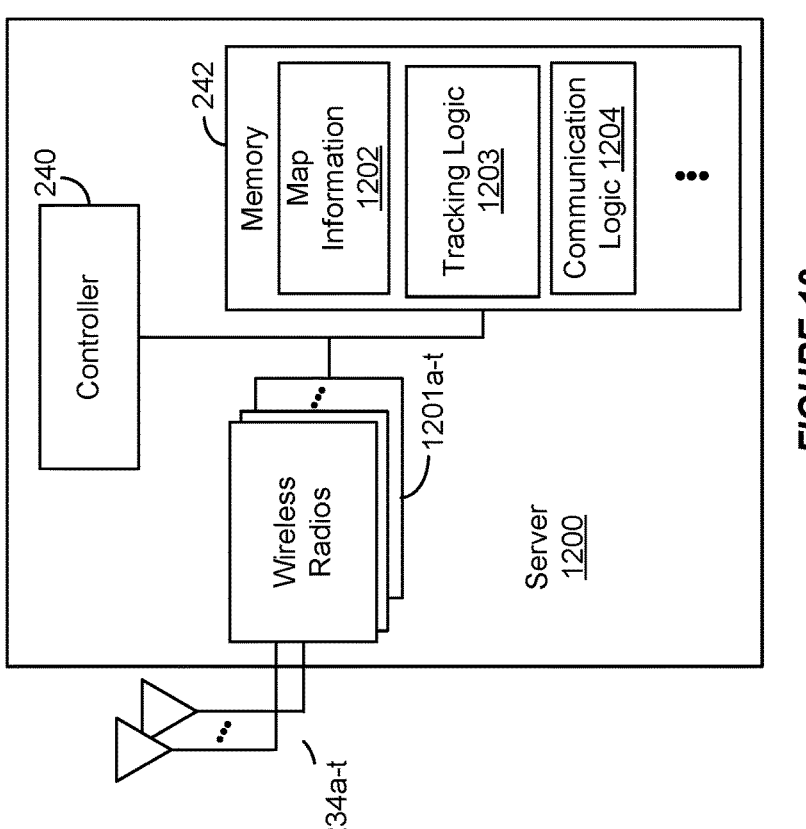
FIG. 12 is a block diagram of an example server that supports a safety system according to one or more aspects.

FIG. 12 is a block diagram of an example server 1200 that supports a safety system according to one or more aspects. Server 1200 may be configured to perform operations, including the blocks of processes described with reference to FIG. 10 or 11. In some implementations, server 1200 includes the structure, hardware, and components shown and described with reference to base station 105, or core network 130. For example, server 1200 may include controller 240, which operates to execute logic or computer instructions stored in memory 242, as well as controlling the components of server 1200 that provide the features and functionality of server 1200. Server 1200, under control of controller 240, transmits and receives signals via wireless radios 1201a-t and antennas 234a-t. Wireless radios 1201a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include map information 1202, tracking logic 1203, and communication logic 1204. Map information 1202 may include or correspond to map data 488, intersection information 499, or path information 497. Tracking logic 1203 may be configured to track or predict travel information (e.g., travel information). Communication logic 1204 may be configured to enable communication between server 1200 and one or more other devices. Server 1200 may receive signals from or transmit signals to one or more UEs (e.g., UE 115), one or more base stations (e.g., base station 105), one or more network entities (e.g., network entity 405), or network entity 1300 of FIG. 13.

Figure 13:
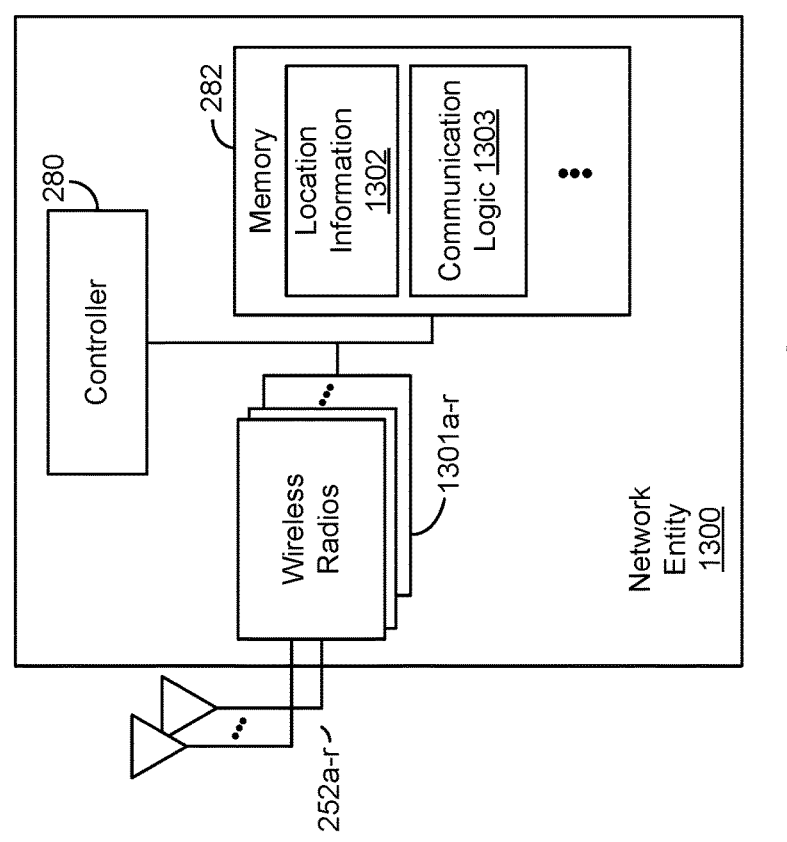
FIG. 13 is a block diagram of an example network entity that supports a safety system according to one or more aspects.

FIG. 13 is a block diagram of an example network entity 1300 that supports a safety system according to one or more aspects. Network entity 1300 may be configured to perform operations described with reference to FIGS. 1-4. In some implementations, network entity 1300 includes the structure, hardware, and components shown and described with reference to UE 115, base station 105, vehicle 450, or network entity 405. For example, network entity 1300 includes controller 280, which operates to execute logic or computer instructions stored in memory 282, as well as controlling the components of UE 700 that provide the features and functionality of network entity 1300. Network entity 1300, under control of controller 280, transmits and receives signals via wireless radios 1301a-r and antennas 252a-r. Wireless radios 1301a-r include various components and hardware, as illustrated in FIG. 2 for UE 115, including modulator and demodulators 254a-r, MIMO detector 256, receive processor 258, transmit processor 264, and TX MIMO processor 266. As another example, network entity 1300 may include or correspond to a base station, such as base station 105 of FIG. 2. In such implementations, wireless radios 1301a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 282 may include location information 1302 and communication logic 1303. Location information 1302 may include or correspond to information 406, 434, or 454, UE information 490, vehicle information 492. Communication logic 1303 may be configured to enable communication between network entity 1300 and one or more other devices. Network entity 1300 may receive signals from or transmit signals to one or more UEs (e.g., UE 115), one or more base stations (e.g., 105), one or more network entities (e.g., network entity 405), core network 130, server 480, or server 1200 of FIG. 12.

It is noted that one or more blocks (or operations) described with reference to FIG. 10 or 11 may be combined with one or more blocks (or operations) described with reference to another of the figures. For example, one or more blocks (or operations) of FIG. 10 may be combined with one or more blocks (or operations) of FIG. 11. As another example, one or more blocks associated with FIG. 10 or 11 may be combined with one or more blocks (or operations) associated with FIGS. 1-4. Additionally, or alternatively, one or more operations described above with reference to FIGS. 1-4 may be combined with one or more operations described with reference to FIGS. 5-9.

In one or more aspects, techniques for supporting a safety system may include additional aspects, such as any single aspect or any combination of aspects described below or in connection with one or more other processes or devices described elsewhere herein. In a first aspect, techniques for supporting a safety system may include receiving first location information associated with a first mobile entity. The techniques may further include transmitting an alert based on the first location information and path information configured to model multiple paths associated with an intersection region. The multiple paths include a first path that is curved. The path information defines multiple line segments to model the first path. In some examples, the techniques in the first aspect may be implemented in a method or process. In some other examples, the techniques of the first aspect may be implemented in a wireless communication device, such as network entity, which may include a server (e.g., a cloud server or other server), a component of a server, a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include estimating, based on the first location information and the path information, a first time period during which the first mobile entity is predicted be in the intersection region.

In a third aspect, in combination with the second aspect, the techniques further include the techniques further include receiving second location information associated with a second mobile entity.

In a fourth aspect, in combination with the third aspect, the techniques further include estimating, based on the second location information and the path information, a second time period during which the second mobile entity will be in the intersection region.

In a fifth aspect in combination with the fourth aspect, the techniques further include generating the alert based on an overlap of the first time period and the second time period.

In a sixth aspect, in combination with one or more of the first aspect through the fifth aspect, the first mobile entity including one of a vehicle or a UE associated with a pedestrian.

In a seventh aspect, in combination with the sixth aspect, the second mobile entity include the other of the vehicle or the UE.

In an eighth aspect, in combination with one or more of the first aspect through the seventh aspect, the path information includes multiple path models.

In a ninth aspect, in combination with the eighth aspect, each path model of the multiple path models is configured to model a different path of the multiple paths.

In a tenth aspect, in combination with the eighth aspect or the ninth aspect, each path model of the multiple path models defines a set of line segments of the path model.

In an eleventh aspect, in combination with the tenth aspect, each path model of the multiple path models includes at least one line segment of the set of line segments of the path model that has an end point positioned in the intersection region.

In a twelfth aspect, in combination with one or more of the eighth aspect through the eleventh aspect, the multiple path models include a first path model of the first path, the first path model defines the multiple lines segments.

In a thirteenth aspect, in combination with the twelfth aspect, a first line segment of the multiple line segments includes a first end point at a first location in the intersection region.

In a fourteenth aspect, in combination with the thirteenth aspect, the multiple path models include a second path model of a second path of the multiple paths.

In a fifteenth aspect, in combination with the fourteenth aspect, the second path model includes one or more line segments to model the second path.

In a sixteenth aspect, in combination with the sixteenth aspect, a second line segment of the one or more line segments includes a second end point at a second location in the intersection region.

In a seventeenth aspect, in combination with the sixteenth aspect, the first location and the second location are the same location.

In an eighteenth aspect, in combination with one or more of the eighth aspect through the seventeenth aspect, for each path model of the multiple path models, for each line segment of the set of line segments of the path model, the path model defines a segment ID of the line segment, a first end point of the line segment, a second end point of the line segment, an azimuth of the line segment, a segment length of the line segment, or a combination thereof.

In a nineteenth aspect, in combination with one or more of the eighth aspect through the eighteenth aspect, the techniques further include determining, based on the first location information, a direction of travel of the first mobile entity and a location of the first mobile entity.

In a twentieth aspect, in combination with the nineteenth aspect, the techniques further include determining distances from the first mobile entity to modeled paths of the multiple path models.

In a twenty-first aspect, in combination with the twentieth aspect, to determine the distances, the techniques further include, for each path model of the multiple path models, determining a distance, in a direction that is perpendicular to the direction of travel, from the location of the first mobile entity to a modeled path of the path model.

In a twenty-second aspect, in combination with the twentieth aspect the twenty-first aspect, the techniques further include selecting a first path model of the multiple path models having a shortest distance of the determined distances.

In a twenty-third aspect, in combination with the twenty-second aspect, the techniques further include assigning the first path model to the first mobile entity.

In a twenty-fourth aspect, in combination with the twenty-third aspect, the techniques further include estimating, based on the first path model assigned to the first mobile entity, a time period that the first mobile entity is predicted to be in the intersection region.

In a twenty-fifth aspect, in combination with the twenty-fourth aspect, the time period includes an entry time that the first mobile entity is predicted to enter the intersection region and an exit time that the first mobile entity is predicted to leave the intersection region.

In a twenty-sixth aspect, in combination with the twenty-fifth aspect, the techniques further include generating the alert based on a determination that the first mobile entity is predicted to be in the intersection region at the same time a second mobile entity.

In a twenty-seventh aspect, in combination with one or more of the twenty-second aspect through the twenty-sixth aspect, the techniques further include determining a line segment of the selected first path model, the line segment associated with the shortest distance.

In a twenty-eighth aspect, in combination with the twenty-seventh aspect, the techniques further include determining a difference based on an azimuth of the line segment and a heading of the first mobile entity.

In a twenty-ninth aspect, in combination with the twenty-eighth aspect, the techniques further include performing a comparison based on the difference and a first threshold.

In a thirtieth aspect, in combination with the twenty-ninth aspect, the techniques further include assigning the first path model to the first mobile entity based on a result of the comparison.

In a thirty-first aspect, in combination with the thirtieth aspect, the techniques further include determining a horizontal estimated position error associated with the first mobile entity.

In a thirty-second aspect, in combination with the thirty-first aspect, the techniques further include performing a comparison based on the horizontal estimated position error and a second threshold.

In a thirty-third aspect, in combination with the thirty-second aspect, the first path model is assigned to the first mobile entity based on the horizontal estimated position error being less than or equal to the second threshold.

In a thirty-fourth aspect, in combination with one or more of the first aspect through the thirty-third aspect, the techniques further include accessing map data.

In a thirty-fifth aspect, in combination with the thirty-fourth aspect, the techniques further include identifying, based on the map data, intersection region information associated with the intersection region.

In a thirty-sixth aspect, in combination with the thirty-fifth aspect, the intersection region information is stored as metadata of the map data and indicates an origin location associated with the intersection region, indicates one or more paths associated with the intersection region, one or more traffic control devices associated with the intersection region, the path information, or a combination thereof.

In a thirty-seventh aspect, in combination with the thirty-sixth aspect, the techniques further include selecting the intersection region based on the first location information.

In a thirty-eighth aspect, in combination with the thirty-seventh aspect, the intersection region selected based on a distance between a first location associated with the first mobile entity and a second location associated with the intersection region, a direction of travel of the first mobile entity, situational awareness information included in the first location information, or a combination thereof.

In a thirty-ninth aspect, in combination with one or more of the first aspect through the thirty-eighth aspect, the techniques further include receiving additional location information associated with the first mobile entity.

In a fortieth aspect, in combination with the thirty-ninth aspect, the techniques further include determining, based on the additional location information, that the first mobile entity is within the intersection region.

In a forty-first aspect, in combination with the fortieth aspect, the techniques further include estimating, based on a dimension of the intersection region, a time that the first mobile entity is predicted to leave the intersection region.

In a forty-second aspect, in combination with one or more of the first aspect through the forty-first aspect, the techniques further include receiving an indicator from the first mobile entity of an alert characteristic.

In a forty-third aspect, in combination with the forty-second aspect, the alert characteristic indicates an amount of time to send the alert prior to a predicted time at which the first mobile entity is predicted to enter the intersection region.

In a forty-fourth aspect, in combination with the forty-second aspect or the forty-third aspect, the alert is transmitted to the first mobile entity based on the indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a server, the method comprising:
   receiving first location information associated with a first mobile entity; and
   transmitting an alert based on the first location information and path information configured to model multiple paths associated with an intersection region, the multiple paths include a first path that is curved, and the path information defines multiple line segments to model the first path; wherein:
   the path information includes multiple path models;
   each path model of the multiple path models is configured to model a different path of the multiple paths; and
   each path model of the multiple path models defines a set of line segments of the path model, and includes at least one line segment of the set of line segments of the path model that has an end point positioned in the intersection region.

2. The method of claim 1, further comprising:

estimating, based on the first location information and the path information, a first time period during which the first mobile entity is predicted be in the intersection region;

receiving second location information associated with a second mobile entity;

estimating, based on the second location information and the path information, a second time period during which the second mobile entity will be in the intersection region; and generating the alert based on an overlap of the first time period and the second time period, and wherein the first mobile entity including one of a vehicle and a user equipment (UE) associated with a pedestrian, and the second mobile entity include the other of the vehicle and the UE.

3. The method of claim 1, wherein:

the multiple path models include:

a first path model of the first path, the first path model defines the multiple lines segments, a first line segment of the multiple line segments includes a first end point at a first location in the intersection region; and a second path model of a second path of the multiple paths, the second path model includes one or more line segments to model the second path, a second line segment of the one or more line segments includes a second end point at a second location in the intersection region; and the first location and the second location are the same location.

4. The method of claim 1, wherein, for each path model of the multiple path models:

for each line segment of the set of line segments of the path model, the path model defines a segment identifier (ID) of the line segment, a first end point of the line segment, a second end point of the line segment, an azimuth of the line segment, a segment length of the line segment, or a combination thereof.

5. The method of claim 1, further comprising:

determining, based on the first location information, a direction of travel of the first mobile entity and a location of the first mobile entity;

determining distances from the first mobile entity to modeled paths of the multiple path models, wherein determining the distances includes:

for each path model of the multiple path models, determining a distance, in a direction that is perpendicular to the direction of travel, from the location of the first mobile entity to a modeled path of the path model; and selecting a first path model of the multiple path models having a shortest distance of the determined distances.

6. The method of claim 5, further comprising:

assigning the first path model to the first mobile entity.

7. The method of claim 5, further comprising:

estimating, based on the first path model assigned to the first mobile entity, a time period that the first mobile entity is predicted to be in the intersection region, the time period including an entry time that the first mobile entity is predicted to enter the intersection region and an exit time that the first mobile entity is predicted to leave the intersection region; and generating the alert based on a determination that first mobile entity is predicted to be in the intersection region at the same time a second mobile entity.

8. The method of claim 5, further comprising:

determining a line segment of the selected first path model, the line segment associated with the shortest distance;

determining a difference based on an azimuth of the line segment and a heading of the first mobile entity;

performing a comparison based on the difference and a first threshold; and assigning the first path model to the first mobile entity based on a result of the comparison.

9. The method of claim 8, further comprising:

determining a horizontal estimated position error associated with the first mobile entity; and performing a comparison based on the horizontal estimated position error and a second threshold, wherein the first path model is assigned to the first mobile entity based on the horizontal estimated position error being less than or equal to the second threshold.

10. The method of claim 1, further comprising:

accessing map data; and identifying, based on the map data, intersection region information associated with the intersection region, and wherein the intersection region information is stored as metadata of the map data and indicates an origin location associated with the intersection region, indicates one or more paths associated with the intersection region, one or more traffic control devices associated with the intersection region, the path information, or a combination thereof.

11. The method of claim 10, further comprising:

selecting the intersection region based on the first location information, the intersection region selected based on a distance between a first location associated with the first mobile entity and a second location associated with the intersection region, a direction of travel of the first mobile entity, situational awareness information included in the first location information, or a combination thereof.

12. The method of claim 1, further comprising:

receiving additional location information associated with the first mobile entity;

determining, based on the additional location information, that the first mobile entity is within the intersection region; and estimating, based on a dimension of the intersection region, a time that the first mobile entity is predicted to leave the intersection region.

13. The method of claim 1, further comprising:

receiving an indicator from the first mobile entity of an alert characteristic, the alert characteristic indicates an amount of time to send the alert prior to a predicted time at which the first mobile entity is predicted to enter the intersection region, and wherein the alert is transmitted to the first mobile entity based on the indicator.

14. A server comprising:

a memory storing processor-readable code; and at least one processor coupled to the memory, the at least one processor configured to execute the processor-readable code to cause the at least one processor to:

receive first location information associated with a first mobile entity; and transmit an alert based on the first location information and path information configured to model multiple paths associated with an intersection region, the multiple paths include a first path that is curved, and the path information defines multiple line segments to model the first path; wherein:

the path information includes multiple path models;

each path model of the multiple path models is configured to model a different path of the multiple paths; and each path model of the multiple path models defines a set of line segments of the path model, and includes at least one line segment of the set of line segments of the path model that has an end point positioned in the intersection region.

15. The server of claim 14, wherein the at least one processor is configured to execute the processor-readable code to cause the at least one processor to:

identify, based on map data, intersection region information associated with the intersection region, and wherein the intersection region information is stored as metadata of the map data and indicates an origin location associated with the intersection region, indicates one or more paths associated with the intersection region, one or more traffic control devices associated with the intersection region, the path information, or a combination thereof.

16. The server of claim 14, wherein, for each path model of the multiple path models:

for each line segment of the set of line segments of the path model, the path model defines a segment identifier (ID) of the line segment, a first end point of the line segment, a second end point of the line segment, an azimuth of the line segment, a segment length of the line segment, or a combination thereof.

17. The server of claim 14, wherein the at least one processor is configured to execute the processor-readable code to cause the at least one processor to:

determine, based on the first location information, a direction of travel of the first mobile entity and a location of the first mobile entity, determine distances from the first mobile entity to modeled paths of the multiple path models; and select a first path model of the multiple path models having a shortest distance of the determined distances.

18. The server of claim 17, wherein the at least one processor is configured to execute the processor-readable code to cause the at least one processor to:

determine a line segment of the selected first path model, the line segment associated with the shortest distance; and determine a difference based on an azimuth of the line segment and a heading of the first mobile entity;

perform a comparison based on the difference and a threshold; and assign the first path model to the first mobile entity based on a result of the comparison.

19. The server of claim 18, wherein the at least one processor is configured to execute the processor-readable code to cause the at least one processor to:

estimate, based on the first path model assigned to the first mobile entity, a time period that the first mobile entity is predicted to be in the intersection region, the time period including an entry time that the first mobile entity is predicted to enter the intersection region and an exit time that the first mobile entity is predicted to leave the intersection region; and generate the alert based on a determination that first mobile entity is predicted to be in the intersection region at the same time a second mobile entity.

20. An apparatus comprising:

means for receiving first location information associated with a first mobile entity; and means for transmitting an alert based on the first location information and path information configured to model multiple paths associated with an intersection region, the multiple paths include a first path that is curved, and the path information defines multiple line segments to model the first path; wherein:

the path information includes multiple path models;

each path model of the multiple path models is configured to model a different path of the multiple paths; and each path model of the multiple path models defines a set of line segments of the path model, and includes at least one line segment of the set of line segments of the path model that has an end point positioned in the intersection region.

21. The apparatus of claim 20, further comprising:

means for identifying, based on map data, intersection region information associated with the intersection region, and wherein the intersection region information is stored as metadata of the map data and indicates an origin location associated with the intersection region, indicates one or more paths associated with the intersection region, one or more traffic control devices associated with the intersection region, the path information, or a combination thereof.

22. The apparatus of claim 20, further comprising:

means for determining a line segment of a first path model of the multiple path models that is closest to a location of the first mobile entity; and means for assigning the first path model to the first mobile entity based a determination that a difference between an azimuth of the line segment and a heading of the first mobile entity is less than or equal to a threshold.

23. The apparatus of claim 22, further comprising:

means for estimating, based on the first path model assigned to the first mobile entity, a time period that the first mobile entity is predicted to be in the intersection region, the time period including an entry time that the first mobile entity is predicted to enter the intersection region and an exit time that the first mobile entity is predicted to leave the intersection region; and means for generate the alert based on a determination that first mobile entity is predicted to be in the intersection region at the same time a second mobile entity.

24. A non-transitory computer-readable medium stores instructions that, when executed by a processor, cause the processor to perform operations comprising:

receiving first location information associated with a first mobile entity; and transmitting an alert based on the first location information and path information configured to model multiple paths associated with an intersection region, the multiple paths include a first path that is curved, and the path information defines multiple line segments to model the first path; wherein:

the path information includes multiple path models;

each path model of the multiple path models is configured to model a different path of the multiple paths; and each path model of the multiple path models defines a set of line segments of the path model, and includes at least one line segment of the set of line segments of the path model that has an end point positioned in the intersection region.

25. The non-transitory computer-readable medium of claim 24, wherein:

for each path model of the multiple path models:

for each line segment of the set of line segments of the path model, the path model defines a segment identifier (ID) of the line segment, a first end point of the line segment, a second end point of the line segment, an azimuth of the line segment, a segment length of the line segment, or a combination thereof.

26. The non-transitory computer-readable medium of claim 24, wherein the instructions that, when executed by the processor, cause the processor to perform the operations further comprising:

identifying, based on map data, intersection region information associated with the intersection region, and wherein the intersection region information is stored as metadata of the map data and indicates an origin location associated with the intersection region, indicates one or more paths associated with the intersection region, one or more traffic control devices associated with the intersection region, the path information, or a combination thereof.

27. The non-transitory computer-readable medium of claim 26, wherein the instructions that, when executed by the processor, cause the processor to perform the operations further comprising:

estimating, based on a first path model assigned to the first mobile entity, a time period that the first mobile entity is predicted to be in the intersection region, the time period including an entry time that the first mobile entity is predicted to enter the intersection region and an exit time that the first mobile entity is predicted to leave the intersection region; and generate the alert based on a determination that first mobile entity is predicted to be in the intersection region at the same time a second mobile entity.

* * * * *